(12) United States Patent
Liu

(10) Patent No.: US 8,640,628 B2
(45) Date of Patent: Feb. 4, 2014

(54) LINEAR PERMANENT MAGNET DRIVING SYSTEM AND PERMANENT MAGNET DRIVING AND MAGNETIC SUSPENSION ROADWAY SYSTEM

(76) Inventor: Zhongchen Liu, Dalian Liaoning (CN)

(*) Notice: Subject to any disclaimer, the term of this patent is extended or adjusted under 35 U.S.C. 154(b) by 213 days.

(21) Appl. No.: 13/060,424

(22) PCT Filed: Aug. 23, 2009

(86) PCT No.: PCT/CN2009/073437
§ 371 (c)(1),
(2), (4) Date: Jul. 22, 2011

(87) PCT Pub. No.: WO2010/022637
PCT Pub. Date: Mar. 4, 2010

(65) Prior Publication Data
US 2011/0271867 A1    Nov. 10, 2011

(30) Foreign Application Priority Data
Aug. 24, 2008   (CN) .......................... 2008 1 0213669

(51) Int. Cl.
*B60L 13/10* (2006.01)
*H02K 41/02* (2006.01)

(52) U.S. Cl.
USPC .................... 104/283; 310/12.09; 104/130.03

(58) Field of Classification Search
USPC ............... 104/130.02, 130.03, 282, 283; 310/12.01, 12.09, 12.14, 12.24–12.26
See application file for complete search history.

(56) References Cited

U.S. PATENT DOCUMENTS

| | | | | |
|---|---|---|---|---|
| 4,712,027 A * | 12/1987 | Karidis | ...................... | 310/12.24 |
| 5,079,458 A * | 1/1992 | Schuster | ................... | 310/12.26 |
| 5,081,381 A * | 1/1992 | Narasaki | ................... | 310/12.27 |
| 7,176,590 B2 * | 2/2007 | Fujimoto | ................... | 310/12.15 |
| 7,235,906 B2 * | 6/2007 | Carroll et al. | ............... | 310/90.5 |
| 7,501,723 B2 * | 3/2009 | Yasuda | ...................... | 310/12.04 |

* cited by examiner

*Primary Examiner* — Zachary Kuhfuss
(74) *Attorney, Agent, or Firm* — DLA Piper LLP (US); Zhaoyang Li

(57) ABSTRACT

The invention relates to a linear permanent magnet driving system and a permanent magnet driving maglev train rail system, the linear permanent magnet driving system comprises spiral rotors and stators, wherein at least one of the spiral rotor and the stator adopts the structure having a permanent magnet while the other one adopts the structure having the permanent magnet or a magnetizer; when the spiral rotors are driven by an engine to rotate, linear motion of the spiral rotors is achieved by means of the magnetic force between both, and speed of the linear motion of the spiral rotors can reach supersonic speed at most. By applying the linear permanent magnet driving system to the permanent magnet driving maglev train rail system, the entire rail can avoid the use of both permanent magnet and driving coil, and the construction cost of maglev train rail is equivalent to that of the current high-speed wheel/rail.

8 Claims, 16 Drawing Sheets

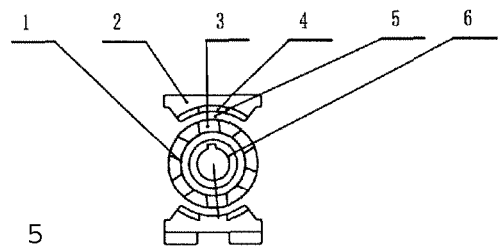
FIG. 5
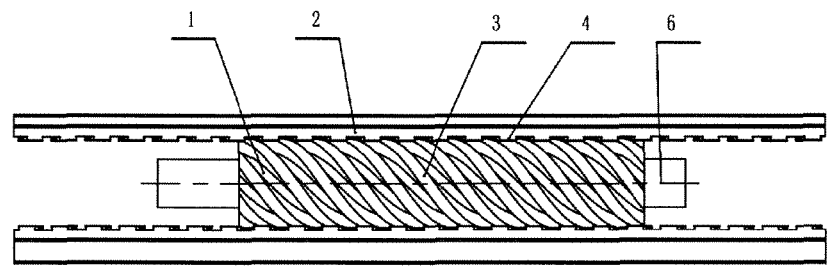
FIG. 6
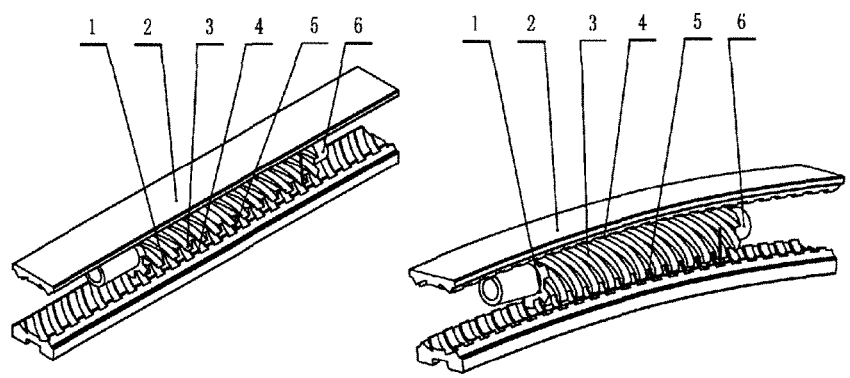
FIG. 7
FIG. 8

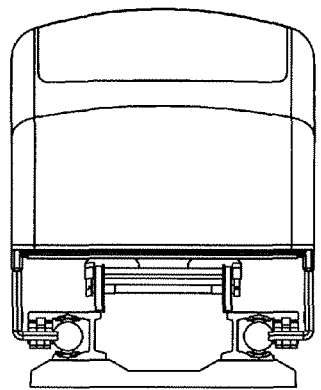
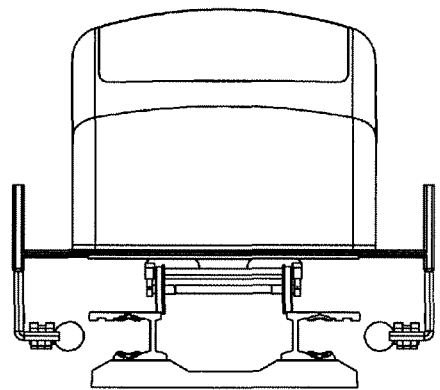
FIG. 36A          FIG. 36B
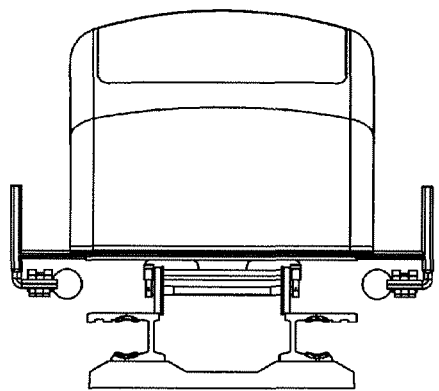
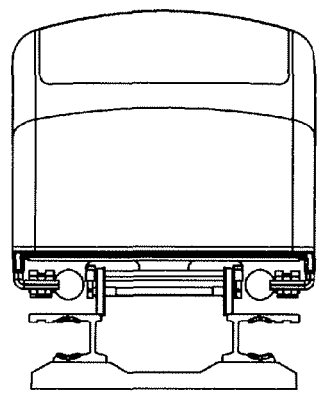
FIG. 36C          FIG. 36D

LINEAR PERMANENT MAGNET DRIVING SYSTEM AND PERMANENT MAGNET DRIVING AND MAGNETIC SUSPENSION ROADWAY SYSTEM

TECHNICAL FIELDS

The invention relates to the technical field of noncontact magnetic force transmission and permanent magnet levitation train, specifically to a linear permanent magnet driving system and a permanent magnet driving maglev train rail system, especially a permanent magnet linear driving maglev train.

BACKGROUND ARTS

Throughout the development history of railway locomotive, railway locomotive has been transformed for generations since the birth, and accordingly, tremendous changes have occurred, from steam locomotive, diesel locomotive and electric locomotive on wheel/rail to maglev train. The wheel/rail train has a long history but simple and mature technique. High speed resulted from the open structure of wheels and rail requires extremely high planeness of the surface of rail, otherwise, even a tiny protrusion or particle could cause derailing and turnover of high-speed wheel/rail train, tragic derailing accidents of wheel/rail train and enormous casualties have been caused yearly over the years, resulting in vast economic loss. Having no contact and almost no mechanical frictional resistance with the rail, the maglev train is characterized by low noise, great comfort, nearly unlimited speed that can exceed the speed of plane, and saving more energy than other transportation means regardless of traveling at high speed or low speed, in addition, the encircling structure of the maglev train and the rail avoids derailing accident of the maglev train, leading the maglev train to be one of the safest transportation means at present. Advantages of the maglev train, such as good safety, high speed and energy saving, have determined that dominant development of rail transportation falls upon the maglev train.

Owing to the characteristics of good safety, high speed and great comfort, the maglev train captured dramatic attention once. A plurality of structures of the maglev train can be found, the high-speed maglev levitation train having an EMS electromagnetic levitation system adopts the suction levitation way of electromagnet and rail as well as electromagnet guidance technique, and such levitation and guidance techniques are relatively simple and practical. The high-speed maglev levitation train having an EDS electric levitation system adopts the levitation and automatic guidance technique of cryogenic superconductive electromagnet and repulsion of coils of the rail, besides, the cryogenic superconducting technology by means of liquid nitrogen cryogenic refrigeration is also adopted, and the EDS technique has higher cost and larger noise than the EMS technique. Rail aluminum plate and onboard permanent magnet system in Magplane maglev plane generate levitation repulsion during operation and can achieve automatic guidance, the control system is structurally simple, however, the use of thick aluminum plate in large quantities leads to higher cost of the rail, semi-arch-shaped rail is liable to result in transverse rolling of cars, what's more, tremendous electromagnetic resistance is generated between onboard permanent magnet and rail aluminum plate so as not to achieve the advantage of saving energy.

Being levitated with the rail entirely, the maglev train obtains quite small frictional resistance of traveling, so the difficult problem of how to achieve fast driving between the maglev train and the rail is generated while extremely high speed is reached. Synchronous linear motor technology is taken as the driving technology regardless of the high-speed maglev trains having the EMS levitation system and the EDS levitation system and the Magplane maglev plane, the rail is distributed with aluminum coils for electromagnetic driving to change the entire rail into a super-huge motor, therefore, the large cost is totally understandable. In order to accurately control the crest synchronization of train and electromagnetic driving, quite advanced synchronous linear motor technology is needed, and considerable investment is required by the construction of power distribution stations along the rail owing to the rail-side long stator sectional power supply and cloth-changing feeding technology, however, the high cost of synchronous linear motor driving rail for high-speed maglev train is prohibitive to nations, which, therefore, cannot achieve extensive population of this technology.

Too small distance between the maglev train and the rail could bring large difficulties to manufacturing and construction, so as to enhance manufacturing cost and arouse unsafe traveling. And too large distance could lead to obvious efficiency reduction of synchronous linear motor, the maximal acceptable levitation height, limited by the efficiency of linear motor, is maintained at about 8 to 12 millimeters. To lower the cost, low-speed maglev train driven by short stator linear induction motors can also be found. The rail adopting short stator linear induction motor driving technology is simple in structure, low in cost and easy in being controlled. However, the distance between train stator and induction board during traveling is about 10 to 12 millimeters, which is far larger than the gap, i.e. 0.5 to 1.0 millimeters, between stator and rotor of rotating motor, thereby resulting in lower power factor and efficiency, i.e. only 0.5-0.7 typically, and large excitation power consumption causes higher heat loss and electromagnetic radiation loss of motor equipment and even lower power factor and efficiency in case of high speed, therefore, the development of the maglev train adopting this technology toward high speed is limited and the maglev train is only suitable for traveling at low speed below 120 kilometer per hour. The induction boards on the rail, which are made of aluminum plate in large quantities, lead to high cost of the entire rail.

The current magnetic levitation technology still has the problem of being non-compatible with common rail and is accordingly free from universality, networkability and compatibility in modern transportation.

Admittedly, having the advantages of small frictional resistance, low energy consumption, the speed as fast as plane, good safety, energy saving, environmental protection and low operating and maintenance costs, the maglev train cannot be replaced by other current high-speed transportation means like plane and high-speed wheel/rail train, and especially, the outstanding energy saving property of the maglev train is profoundly realistically significant to the current situation of petroleum resource that is on the verge of depletion. The levitation technology of the maglev train is very mature, so the key to determine the future cost of the maglev train lies in driving technology under the state of levitation. It is the laying of aluminum coils on the rail or the use of thick aluminum plates in large quantities as required by the current high-speed maglev train driving way that leads to considerable cost of the entire rail to further make maglev technology inaccessible, and the short stator linear induction motor of low-speed maglev train is low in driving efficiency, so cost and efficiency of noncontact driving technology become a determining factor for the future of maglev technology, in case that the noncontact linear driving technology characterized by high driving efficiency, powerful driving force and low cost appears and lowers the construction cost of maglev train rail to be almost equal to that of high-speed wheel/rail, the maglev train is endowed with incomparable superiors and will become one of the most promising transportation means in the future.

Invention Contents:

Given the above deficiencies in the prior art, the invention aims at providing a next-generation linear permanent magnet driving system having the advantages of large thrust, low cost, high transmission efficiency, low noise and great suitability for high-speed transmission, and a permanent magnet levitation train rail system having the advantages of fast speed, high efficiency and low cost. The synchronous linear motor driving and the linear induction motor driving are replaced by non-power-consumed permanent magnet linear driving, rotational motion is converted into linear motion on the basis of the principal of spiral transmission, steel materials with low cost and good magnetic conductivity, instead of copper-aluminum coils and permanent magnets with high cost and aluminum plates, are used for the construction of rail in order to realize the most inexpensive high-efficiency non-contact linear permanent magnet driving. The electromagnetic levitation and the superconductive eddy current levitation are replaced by non-power-consumed permanent magnet levitation, zero-power control for levitation and guidance is implemented by means of the auxiliary control of guide wheels or electromagnets so that permanent magnet suction can be adjusted at any time according to train load, thus complete suspension can be achieved without strong control current. The maglev train is further provided with a driving transformation device that can realize skillful interchange of the maglev rail and the current wheel/rail, leading the maglev rail to universality, networkability and compatibility in transportation.

The technical solution of the invention is implemented in such a manner that:

A linear permanent magnet driving system, comprising an engine, rotors, stators, a main bearing and a bearing block, the shaft journal of the rotor is connected with an output end of the engine via a transmission shaft and the main bearing is supported at two ends of the rotor and is in sliding fit with the bearing block;

Wherein the rotors are formed into spiral rotors by spiral blocks which are raised outwards around a circumferential surface thereof and arranged spirally in the direction of the rotor shaft thereof, the spiral blocks form single-head spirals or multiple-head spirals;

The surfaces on the stators, opposite to the spiral rotors, are distributed with regular raised structures corresponding to the spiral blocks;

And at least one of the spiral rotor and the stator adopts the structure having a permanent magnet while the other one adopts the structure having the permanent magnet or a magnetizer;

The structure of the stators is one of the following structures or the combination thereof:

(1) the stators are spiral stators of a sleeve structure coaxial with the spiral rotors, the raised structures thereon are spiral strips corresponding to the spiral blocks on the spiral rotors and single-head spirals or multiple-head spirals are correspondingly formed;

pitches of the spiral rotors and the spiral stators are consistent, and spiral angle β<90°;

(2) the stators are spiral stators of more than 1 non-closed tiling-shaped structure coaxial with the spiral rotors and distributed in the circumferential direction of the spiral rotors, the raised structure on the stators are spiral strips corresponding to the spiral blocks on the spiral rotors and single-head spirals or multiple-head spirals are correspondingly formed;

pitches of the spiral rotors and the spiral stators are consistent, and spiral angle φ 90°;

(3) the stators are spiral stators of more than 1 non-closed tiling-shaped structure distributed in the circumferential direction of the section of the spiral rotors, wherein the axis is a curve slightly curved, the raised structure on the stators are spiral strips corresponding to the spiral blocks on the spiral rotors and single-head spirals or multiple-head spirals with slightly-curved axis are correspondingly formed;

pitches between the spiral rotors and the spiral stators are consistent, and spiral angle β<90';

(4) the corresponding surfaces of the stators and the spiral rotors are planes, the raised structures thereon are helical toothed strips, curved-side rhombic, fusiform or cylindrical, and the curved-side rhombuses are the raised structures composed of the intersections of the left-spiral and right-spiral strips.

The linear permanent magnetic driving system further comprising:

A spiral rotor axial permanent magnet thrust positioning device, which is mainly composed of a permanent magnet ring and permanent magnet discs;

The permanent magnet ring is coaxially fixed on the shaft journal of the spiral rotors;

The permanent magnet discs are fixed inside the bearing block and arranged at two sides of the permanent magnet ring in the axial direction and opposite to the permanent magnet ring in a homopolar manner respectively.

The invention simultaneously discloses a permanent magnet driving maglev train rail system, comprising:

A linear permanent magnetic driving system, a permanent magnet levitation system, a guide wheel safety system and an electromagnetic auxiliary control system, Wherein the linear permanent magnetic driving system comprises an engine, rotors, stators, a main bearing and a bearing block, wherein the shaft journal of the rotor is connected with an output end of the engine via a transmission shaft and the main bearing is supported at two ends of the rotor and is in sliding fit with the bearing block;

The rotors are formed into spiral rotors by spiral blocks which are raised outwards around a circumferential surface thereof and arranged spirally in the direction of a rotor shaft thereof, the spiral blocks form single-head spires or multiple-head spires;

The surfaces on the stators, opposite to the spiral rotors, are distributed with regular raised structures corresponding to the spiral blocks;

And at least one of the spiral rotor and the stator adopts the structure having a permanent magnet while the other one adopts the structure having the permanent magnet or a magnetizer;

The structure of the stators is one of the following structures or the combination thereof:

(1) the stators are spiral stators of more than 1 non-closed tiling-shaped structure coaxial with the spiral rotors and distributed in the circumferential direction of the spiral rotors, the raised structure on the stators are spiral strips corresponding to the spiral blocks on the spiral rotors and single-head spirals or multiple-head spirals are correspondingly formed;

pitches of the spiral rotors and the spiral stators are consistent, and spiral angle β<90';

(2) the stators are spiral stators of more than 1 non-closed tiling-shaped structure distributed in the circumferential direction of the section of the spiral rotors, wherein the axis is a curve slightly curved, the raised structure on the stators are spiral strips corresponding to the spiral blocks on the spiral rotors and single-head spirals or multiple-head spirals with slightly-curved axis are correspondingly formed;

pitches between the spiral rotors and the spiral stators are consistent, and spiral angle β<90';

(4) the corresponding surfaces of the stators and the spiral rotors are planes, the raised structures thereon are helical toothed strips, curved-side rhombic, fusiform or cylindrical.

The spiral rotors are connected with maglev train body via a connecting arm, and the stators are fixed on the rail to form, with the rail, a split/combination structure or an integrated structure.

Wherein the linear permanent magnetic driving system further comprises a spiral rotor axial permanent magnet thrust positioning device, comprising a permanent magnet ring and permanent magnet discs;

The permanent magnet ring is coaxially fixed on the shaft journal of the spiral rotors;

The permanent magnet discs are fixed inside the bearing block and arranged at two sides of the permanent magnet ring in the axial direction and opposite to the permanent magnet ring in a homopolar manner respectively.

Wherein the permanent magnet levitation system is capable of adjusting levitation suction and comprises an iron core and an armature opposite thereto, the iron core is U-shaped or H-shaped, a permanent magnet adjustment device is embedded into the position of a middle linkage bridge of the U-shaped or H-shaped iron core, and the permanent magnet adjustment device comprises a cylindrical rotating shaft, the middle of which is grooved for the installation of the permanent magnet; the armature is fixed on the rail or the stators to form, with the rail and the stators, a split/combination structure or an integrated structure.

Given that magnetism is increased, the lower part of the bottom and/or middle linkage bridge of the H-shaped iron core can be provided with the permanent magnet.

The electromagnetic auxiliary control system comprises an electromagnetic auxiliary levitation system and an electromagnetic auxiliary guide system;

The electromagnetic auxiliary levitation system is installed on the iron core of the permanent magnet levitation system capable of adjusting levitation suction, in order to be corresponding to the armature vertically;

And the electromagnetic auxiliary guide system is installed on the connecting arm to be corresponding to the armature horizontally.

The permanent magnet driving maglev train rail system further comprises a turnout switching system, which is installed at the turnout of the rail and comprises a pair of translational or rotational turnout bottom plates, a switching joint bottom plate, a switching driving device and a transmission device; the turnout bottom plate is equipped with a transitional rail respectively comprising a straight rail and a curved rail, the switching joint bottom plate is equipped with a engaging rail for the curved rail; under the action of the control system, the switching driving device leads the turnout bottom plates to translation or rotation via the transmission device, thereby achieving the jointing of the straight rails or the curved rails.

The permanent magnet driving maglev train rail system further comprises a driving transformation system which comprises transverse, longitudinal movement devices connected with the connecting arm, the transverse, longitudinal movement devices are respectively connected with the connecting arm and, under the action of the control system, lead the connecting arm to horizontal and vertical movement, so as to complete the positioning of the spiral rotors and the stators to further realize permanent magnet driving or move the spiral rotors away from the stators to further realize conventional non-magnetic force driving.

Compared with the prior art, the linear permanent magnet driving system of the invention has the extremely prominent advantages of:

1. High transmission efficiency. Adopting permanent strong magnets for noncontact transmission, the linear permanent magnet driving system of the invention has almost no mechanical friction, no change of magnetic field, almost no generation of electromagnetic resistance and eddy current loss and almost no energy loss, transmission pairs consisting of the spiral rotors and the stators reach nearly 100% of the transmission efficiency, which is higher than the transmission efficiency of linear synchronous motor and linear induction asynchronous motor, and the entire transmission efficiency of the system is identical to that of rotating motor with the magnetic force gap ranging from 0.5 to 1.0 millimeter, so maximal effectiveness of prime motor can be brought into play.

2. Large noncontact transmission gap. Magnetic gap between permanent magnet spiral rotors and stators is up to 10 to 100 mm, which still guarantees large transmission force. On the premise of ensuring adequate thrust, even when the magnetic gap is up to 10 to 100 mm, nearly 100% of the transmission efficiency can still be maintained only in case of no slippage.

3. Large transmission force and small volume. The permanent magnets of the spiral rotors are distributed according to the spires and centralized above the circumference, the transmission area of the permanent magnets after being unfolded is equivalent to the level that linear motor is increased by 1.5 to 3 times, thus smaller volume can be achieved under the same thrust.

4. High transmission speed. The spiral blocks on the rotating spiral rotors are integrated with the rotors to obtain large connection area and the connection firmer than that of turbine blades of jet engine, so safe transmission can still be implemented even in case that the linear speed of the outer surface of the spiral rotors reach supersonic speed. When the spiral angle is 45°, the circumferential rotating linear speed of the outer surface of the spiral rotors is identical to the axial transmission speed, therefore, the transmission speed of the invention can reach supersonic speed, and by using the system as maglev train driving system, the distance between cities and even between countries can be further shortened.

5. Uniform transmission force without fluctuation. As the spiral transmission of ball screw, the transmission force is uniform without contact and almost without fluctuation.

6. Small vibration and low noise. The spiral rotors in a regular cylindrical shape can realize quite high dynamic and static balance. Shielding sleeves can also be coated at certain distance from the outer surface of the spiral rotors, the sound generated by airflow agitation during rotation can be shielded inside the shielding sleeves, so the vibration is slight and the noise is low.

7. Safe and steady operation. According to gyroscopic principles, the spiral rotors can maintain excellent inertia at high rotating speed, and excellent steadiness can be obtained when the system is applied to maglev train traveling at high speed.
8. Strong power adaptability. The linear driving system of the invention can realize linear driving only if providing rotating power, hence, in addition to electric power driving, a variety of prime engines such as diesel engine, gasoline engine, pneumatic motor, hydraulic motor and the like can also be adopted for driving, making the maglev train to adapt to long-distance travel. Wind energy, air energy, electric energy, solar energy and nuclear energy, which are all environmentally friendly, can be utilized. When the system is applied to maglev train for low-speed traveling within short distance in urban area, the energy of pneumatically stored compressed air or onboard power supply can be employed to drive the maglev train, thereby avoiding the use of current collectors and aerial cables above the rail and the need of constructing power supply line along the rail, as well as further obtaining environmental friendliness, cleanness, simplicity and beauty.
9. Energy and power saving. The transmission pairs, with no need of power consumption and near 100% of the transmission efficiency, can exert very high working efficiency at both low and high rotating speeds, so the vibration of the spiral rotors is small, the noise is low, the energy loss is small and the energy saving effect is outstanding.
10. Wide application prospect. The linear permanent magnet driving system of the invention can be extensively applied to maglev train, noncontact transmission machinery and equipment, the transportation of corrosive non-leakage petroleum and chemical industry, and can also be applied to the noncontact linear transmission in the fields of machinery industry, electronic industry, construction industry, industrial production, scientific experiment, medical health service, etc.

Apart from the above advantages resulted from the adoption of the linear permanent magnet driving system described above, the permanent magnet driving maglev train rail system of the invention also has the following obvious advantages:

1. In the aspect of energy and power saving, in addition to the energy and power saving effect resulted from permanent magnet driving, train levitation is achieved by the permanent magnet levitation technology in which almost no power is consumed, so the maglev train can save energy several times as much as common wheel/rail train and save energy by 60% to 90% compared with subway train and light rail train in case of low speed traveling, conforming to the policy of energy conservation and pollution reduction.
2. Low total construction cost of the rail. It is possible for the entire rail to be made of low-cost steel materials without permanent strong magnets, driving copper or aluminum coils on the rail and aluminum plates in large quantities, therefore, the construction cost of the rail is quite low, equivalent to the construction cost of high-speed wheel/rail. The construction of both control power station divisions along the rail and complex control electrical systems is avoided, so the construction cost along the rail is low. High processing accuracy of the iron cores of the spiral stators on the rail is not required owing to large gap of transmission magnetic force, so the manufacturing process is simple and the manufacturing cost is low. As a result of that, the total construction cost of the linear permanent magnet driving maglev train rail is lowered to the level equivalent to the construction cost of high-speed wheel/rail, which will remarkably promote the popularization and generation of magnetic levitation technology.
3. The turnouts are structurally simple and easily controlled, the rail is firm and accurate in positioning and precise in jointing, as well as has not large bending deformational stress generated during switching, higher permissible traveling speed at the curved rail than deformational rail and longer service life, so the system is suitable for various rails with complex shape.
4. Great universality. The system overcomes the non-compatibility problem between the maglev train and the existing rail transportation system, and can accordingly, realize the interchangeability of maglev rail and common rail, i.e. both the maglev train at high speed and the common wheel/rail train at low speed can travel on the permanent magnet driving levitation rail, the wheel/rail train can also travel on the maglev rail temporally, the maglev train equipped with double-driving system not only can travel at normal speed on common rail, but can also travel at high speed on the permanent magnet driving levitation rail, leading the maglev rail to universality, networkability and compatibility in transportation. Modernized scheduling system and human-computer engineering system same as the rail control system can be used as operation scheduling system.

In light of the advantages described above, the permanent magnet driving maglev train rail system of the invention has wide application prospect, can be extensively applied to inter-city high-speed rail train, subway train in city, light rail train and streetcar, and will become one of the civilization signs of modern city.

BRIEF DESCRIPTION OF DRAWINGS

FIG. 5 is a structural schematic diagram of two bushing-shaped long spiral stator magnetic force transmission pairs, coaxial with the spiral rotors, of the linear permanent magnet driving system.

FIG. 6 is a lateral view of FIG. 5.

FIG. 7 is a stereoscopically structural schematic diagram of FIG. 5.

FIG. 8 is a stereoscopically structural schematic diagram of the bending long spiral stator magnetic force transmission pairs, with the axis slightly curved, of the linear permanent magnet driving system.

FIG. 36(a) to FIG. 36(d) is structural schematic diagrams of the driving transformation process of the universal maglev train.

Figures 1, 2:
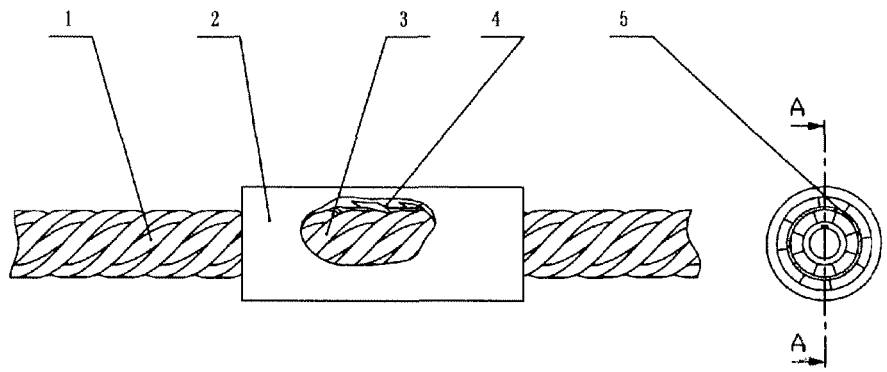
FIG. 1 is a structural schematic diagram of the sleeve-type short spiral stator linear magnetic force transmission pairs of the linear permanent magnet driving system.
FIG. 2 is a lateral view of FIG. 1.
Figure 3:
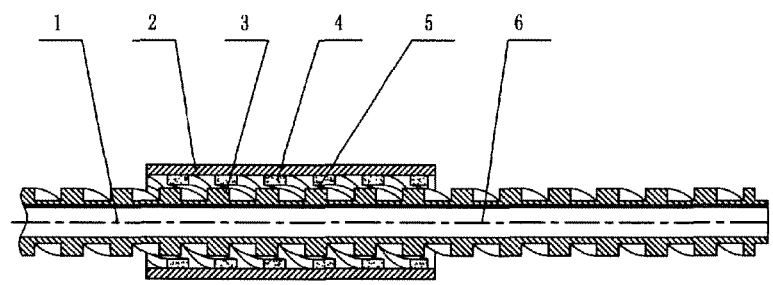
FIG. 3 is a sectional view of the sleeve-type short spiral stator linear magnetic suction transmission pairs of the linear permanent magnet driving system.
Figure 4:
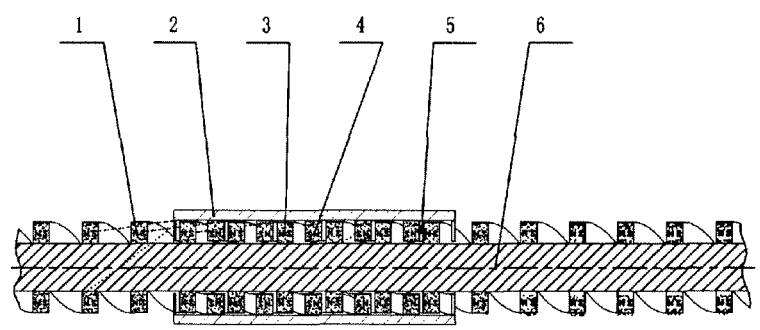
FIG. 4 is a sectional view of the sleeve-type short spiral stator linear magnetic repulsion transmission pairs of the linear permanent magnet driving system.
Figure 9:
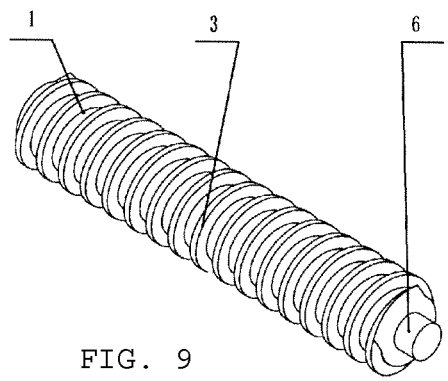
FIG. 9 is a stereoscopically structural schematic diagram of the permanent magnet single-head spiral rotors of the linear permanent magnet driving system.
Figure 10:
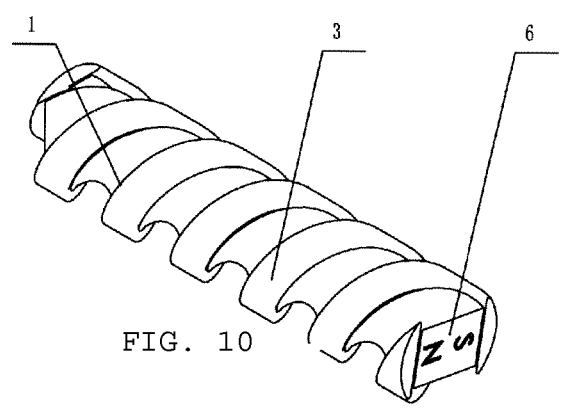
FIG. 10 is a stereoscopically structural schematic diagram of the double-head spiral rotors, with permanent magnet core built in, of the linear permanent magnet driving system.
Figure 11:
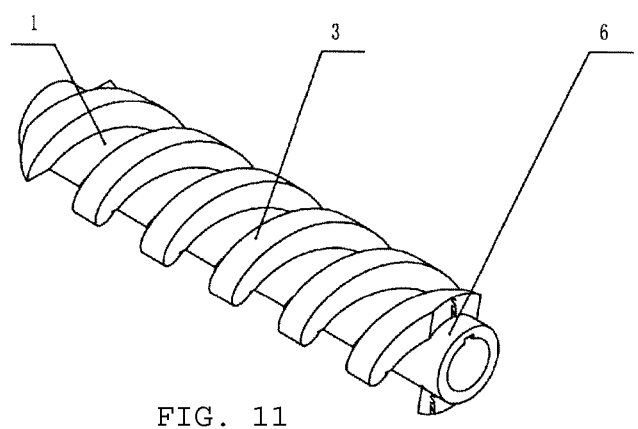
FIG. 11 is a stereoscopically structural schematic diagram of the permanent magnet double-head spiral rotors of the linear permanent magnet driving system.

1,1'. Spiral rotor 2. Stator or spiral stator 3. Spiral block 4. Spiral strip or raised structure on the stator 5. Gap between the spiral block and the spiral strip or the raised structure on the stator under the action of magnetic force 6. Mandrel of the spiral rotor 7. Armature 8. Permanent magnet disc 9. Permanent magnet ring 10. Connecting arm 11. Motor 12. Levitation-assistant electromagnetic coil 13. Transmission shaft 14. Main bearing 15. Bearing block 16. Airbus/train body 17. Concrete viaduct pier 18. Concrete viaduct cross beam 20. U-shaped/H-shaped iron core 21. Rotating shaft 22. Guide wheel 23. Roadbed 24. Underground hole 25. Suspension-type rail 26. Positioning rail 19, 27, 29. Permanent magnet 28. Guidance-assistant electromagnetic coil 30. Ground surface opening of underground rail 34, 34', 38, 38'. Linear rail I 35, 35'. Turnout bottom plate 36, 36', 42, 42'. Transitional straight rail on the turnout bottom plate 37, 37', 41, 41'. Transitional curved rail on the turnout bottom plate 39, 39'. Middle transitional rail 40, 40'. Linear rail II 50. Train chassis 51. Suspension 52. Wheel shaft 53. Wheel 54. Rail bearing 55. Rail 61. Longitudinal lifting device 62. Transverse movement device 63. Displacement sensor

DETAILED DESCRIPTION OF EMBODIMENTS

Detailed description is further made to the invention with reference to the drawings.

Shown as FIGS. 5, 6 and 7, the linear permanent magnet driving system is mainly composed of a spiral rotor 1 and a spiral stator 2 which are arranged coaxially. The spiral stator 2 comprises two bushing-shaped structures characterized by cylindrical side faces with longitudinally through openings. The outer diameter of spiral blocks 3 on the spiral rotor 1 is smaller than the inner diameter of spiral strips 4 on the spiral stator 2, and a gap 5 is formed there between. The inner surface of the spiral stator 2 is provided with the raised spiral strips 4, the outer surface of the spiral rotor 1 is provided with the raised spiral blocks 3, and the spiral strips 4 and the spiral blocks 3 can be either permanent magnets or permanent magnet and magnetizer. In the structure shown as FIGS. 5, 6 and 7, the spiral strips 4 of the longer spiral stator 2 are the magnetizer and the spiral blocks 3 on the shorter spiral rotor 1 are the permanent magnet, such as neodymium iron boron material; magnetic force is generated between both to achieve mutual attraction in order to realize noncontact magnetic force transmission. Since the quite large magnetic suction hardly leads the opposite spiral strip to dislocation, the spiral rotor 1 rotates and the spiral strips of the spiral rotor 1 implement spiral motion along the spiral stator 2 when the spiral stator 2 is fixed, thereby realizing noncontact magnetic force transmission. Namely, the spiral rotor 1 and the spiral stator 2 form into noncontact spiral transmission pairs by means of the spiral blocks 3 and the spiral strips 4 that are mutually attracted.

The spiral rotor and the spiral stator, arranged coaxially, are likely to be eccentric or angled to each other in actual application, which is chiefly caused by assembly error or turning.

Shown as FIG. 8, the spiral stator 2 of the linear permanent magnet driving system is still composed of two bushing-shaped structures, the outer diameter of the spiral blocks 3 on the spiral rotor 1 is smaller than the inner diameter of the spiral strips 4 on the spiral stator 2, and the gap 5 is formed there between. The difference from the former is that the axis thereof is bent and slightly curved, so it can be used for the spiral stators at the turnings in the maglev train rail system.

Figure 15:
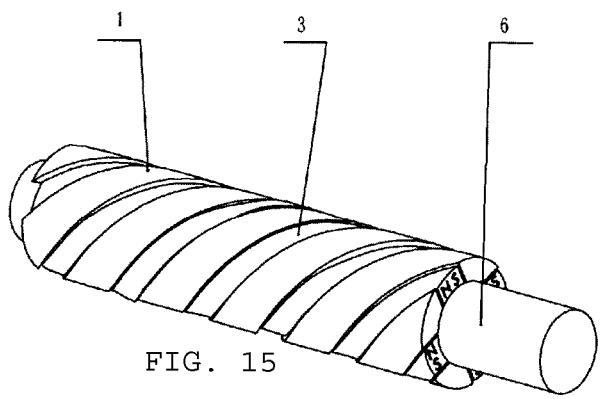
FIG. 15 is a stereoscopically structural schematic diagram of permanent magnet four-head spiral rotors, with the iron core, of the linear permanent magnet driving system.
Figure 16:
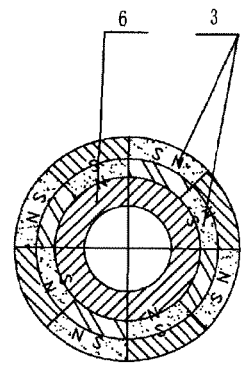
FIG. 16 is a schematic diagram of magnetic pole distribution on the cross section of double-layered combination-type spiral rotors of the linear permanent magnet driving system.
Figure 17:
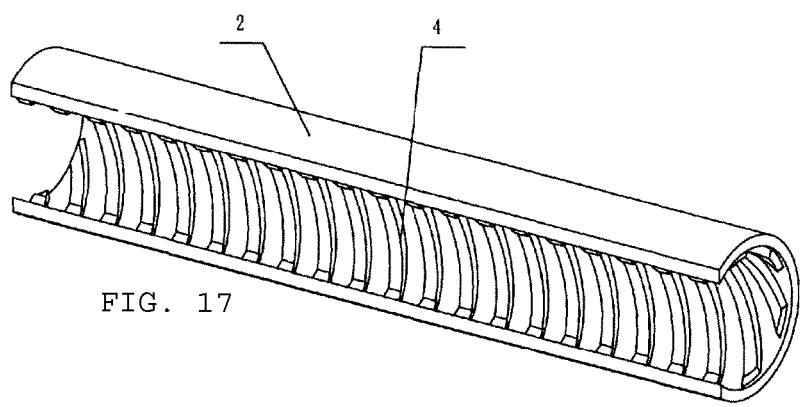
FIG. 17 is a stereoscopically structural schematic diagram of single-opening bushing-shaped spiral stators of the linear permanent magnet driving system.

The number of the spires that are formed by the spiral blocks 3 of the spiral rotor 1 and the spiral strips 4 of the spiral stator 2 can be one or more than one, and even preferably, and the distribution manner of magnetic poles thereof can be radial, axial, circumferential or the combination thereof, shown as FIGS. 9 to 11 and FIGS. 14 to 16; FIG. 15 further shows a spiral rotor embedded with permanent magnet spiral blocks, a mandrel 6 of the spiral rotor 1 is a non-magnetizer material, such as aluminum, stainless steel, nonmetals and the like, the outer circumferential surface of the spiral rotor 1 is made of magnetizer material, spiral grooves are dug on the outer circumferential surface of the spiral rotor in the spiral direction and are embedded with the spiral blocks 3 made of permanent magnet material, magnetic poles thereof are distributed in the circumferential direction shown as FIG. 15, the adjacent magnetic poles are opposite to each other in a homopolar manner, thus more centralized strong magnetic field can be conducted by the spiral rotor 1.

Figure 12:
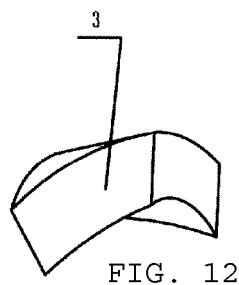
FIG. 12 is an appearance stereoscopic diagram of the spiral blocks on the spiral rotors of the linear permanent magnet driving system.
Figure 13:
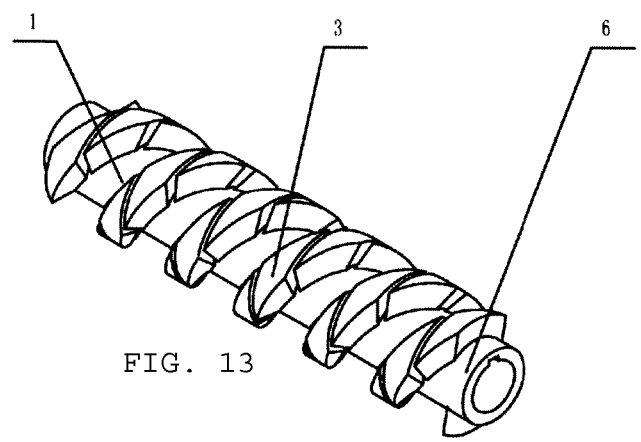
FIG. 13 is a stereoscopically structural schematic diagram of the double-head spiral rotors of discontinuous magnetic poles of the linear permanent magnet driving system.
Figure 14:
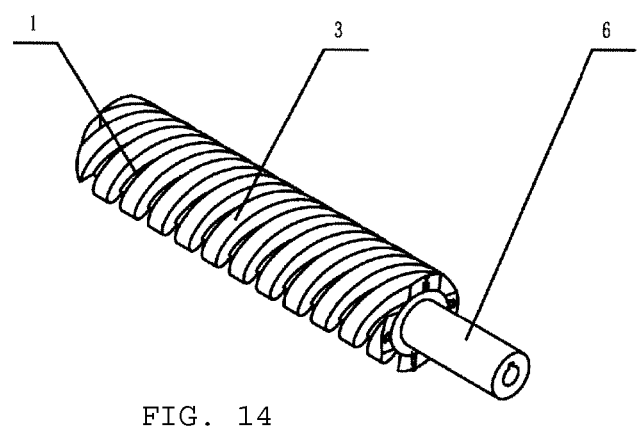
FIG. 14 is a stereoscopically structural schematic diagram of permanent magnet four-head spiral rotors of the linear permanent magnet driving system.

The pitch between the spiral rotor 1 and the spiral stator 1 is consistent, and the spiral angle β<90'; the spiral blocks of the spiral rotor 1 can be either integral or the combination of discontinuous small pieces, shown as FIGS. 12 and 13.

When the spiral angle of the spires of the spiral rotor 1 and the spiral stator 2 is 45°, the circumferential rotating linear speed of the spiral rotor 1 is identical to the axial operating speed, namely the circumferential rotating linear speed on the surface of the spiral rotor 1 is identical to the axial forward speed. When the spiral angle of the spires of the spiral rotor 1 and the spiral stator 2 is smaller than 45°, the axial forward speed of the spiral rotor 1 is smaller than the circumferential rotating linear speed of the spiral rotor 1 so as to achieve reduction transmission; and when the spiral angle of the spires of the spiral rotor 1 and the spiral stator 2 is larger than 45°, the axial forward speed of the spiral rotor 1 is larger than the circumferential rotating linear speed of the spiral rotor 1 so as to achieve acceleration transmission. The transmission ratio of linear permanent magnet driving machine can be changed by changing the spiral angle of the spires.

Apart from the structure of the aforementioned spiral stator, the stator 2 can also adopt a planar structure, the raised structures thereon corresponding to the spiral blocks of the spiral rotor can be, apart from the structure of the spiral strips, helical rack-shaped, curved-side rhombic, fusiformis, cylindrical and the like, shown as FIGS. 19, 20, 21 and 22.

Figure 23:
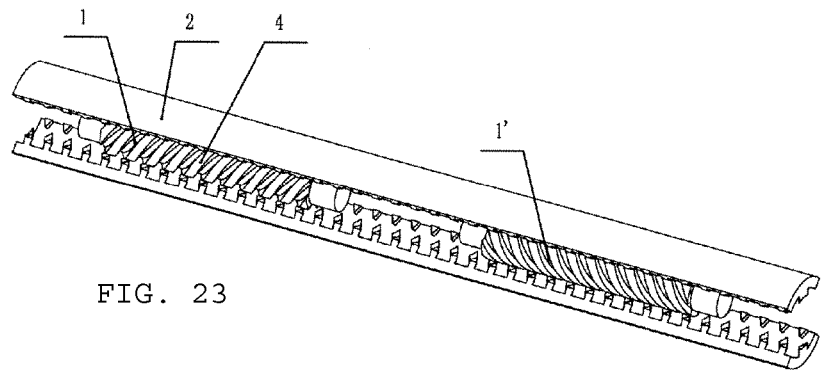
FIG. 23 is a stereoscopically structural schematic diagram of bidirectional transmission spiral stators of the linear permanent magnet driving system.

The raised structures of the spiral stator 2 can also be curved-side rhombic, and the curved-side rhombuses are the raised structures composed of the intersections of the left-spiral and right-spiral strips, therefore, on this spiral stator 2, a left-spiral rotor 1 and a right-spiral rotor 1' can be used cooperatively simultaneously, shown as FIG. 23.

Filling material, magnetically conductive material or magnetically non-conductive material, can be arranged between the spiral blocks 3 of the spiral rotor. The filling material can server as a pressing block for positioning, connecting and fixing the spiral blocks 3.

A protective sleeve can also be coated on the surface of the spiral rotor 1. The protective sleeve is made of magnetically non-conductive material.

Shielding sleeves can also be arranged at certain distance from the surface of the above spiral rotor 1 in order to reduce the outwards conducting noise of rotating airflow and lower the noise, thus the noise of the spiral rotor 1 during high-speed rotation is low as well.

Figure 18:
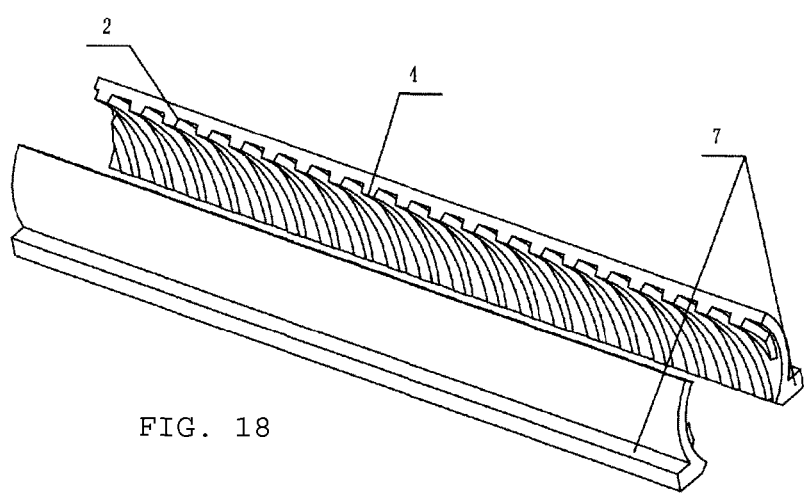
FIG. 18 is a stereoscopically structural schematic diagram of the integrated structure of double-opening bushing-shaped spiral stators and armature of the linear permanent magnet driving system.
Figure 19:
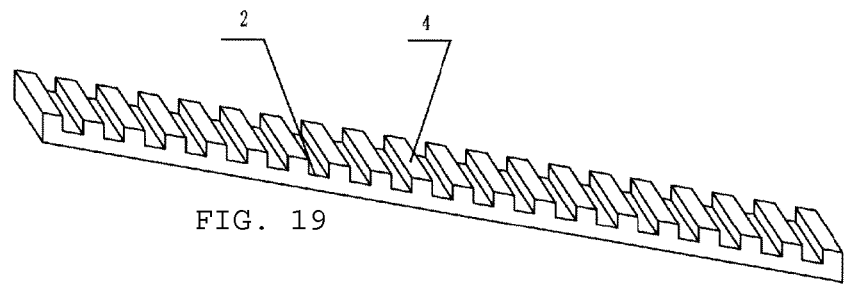
FIG. 19 is a stereoscopically structural schematic diagram of planar stators, with the helical rack-shaped raised structures, of the linear permanent magnet driving system.
Figure 20:
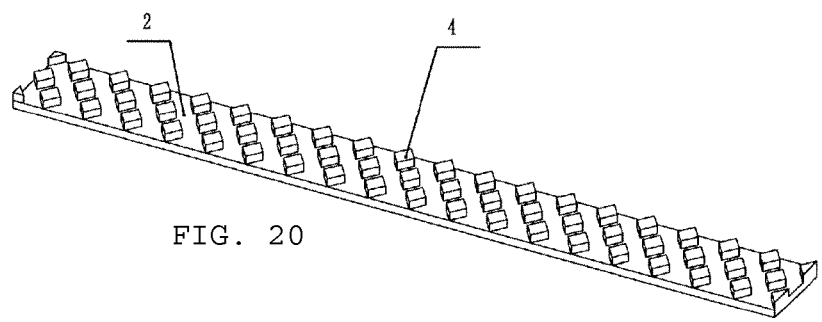
FIG. 20 is a stereoscopically structural schematic diagram of planar stators, with the curved-side rhombic raised structures, of the linear permanent magnet driving system.
Figure 21:
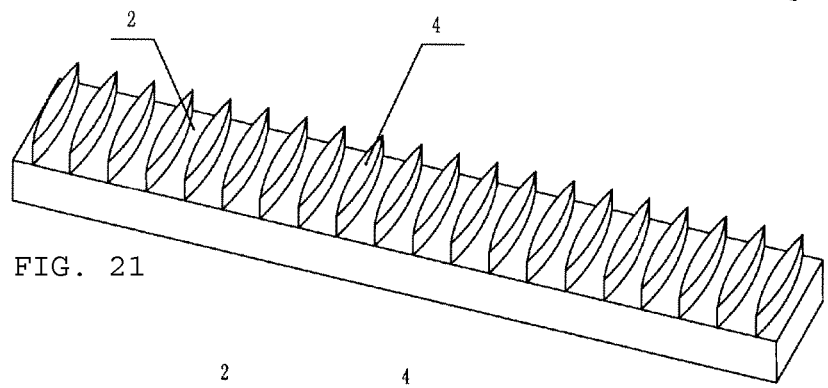
FIG. 21 is a stereoscopically structural schematic diagram of planar stators, with the fusiform raised structures, of the linear permanent magnet driving system.
Figure 22:
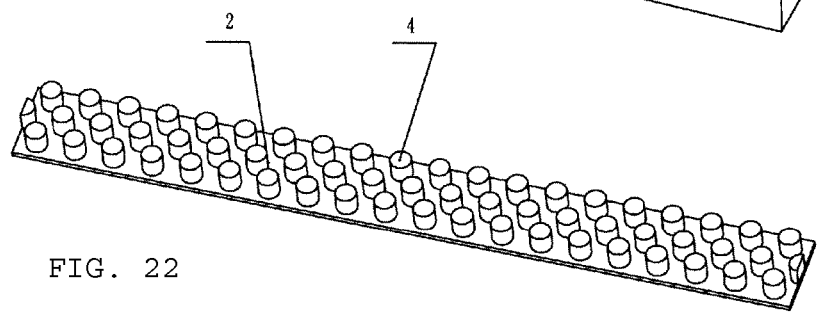
FIG. 22 is a stereoscopically structural schematic diagram of planar stators, with the cylindrical raised structures, of the linear permanent magnet driving system.

An armature 7 can serve as rail or be connected with rail as a part thereof; the armature 7 can also be integrated with the stator, shown as FIG. 18.

Figure 24:
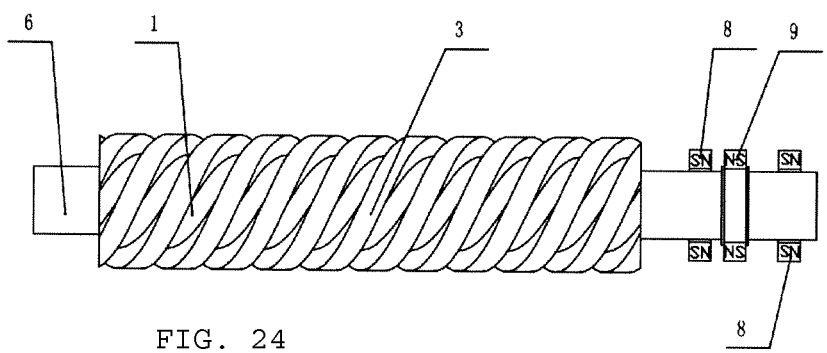
FIG. 24 is a structural schematic diagram of the spiral rotors, with the spiral rotor axial permanent magnet thrust positioning device, of the linear permanent magnet driving system.

The linear permanent magnet driving system further comprises a spiral rotor axial permanent magnet thrust positioning device, which is mainly composed of, shown as FIG. 24, a permanent magnet ring 9 and permanent magnet discs 8:

The permanent magnet ring 9 is coaxially fixed on the shaft journal of the spiral rotor 1;

The permanent magnet discs 8 are fixed inside a bearing block 15 of the linear permanent magnet driving system and arranged at two sides of the permanent magnet ring 9 in the axial direction in order to be opposite to the permanent magnet ring 9 respectively in a homopolar manner.

Figure 25:
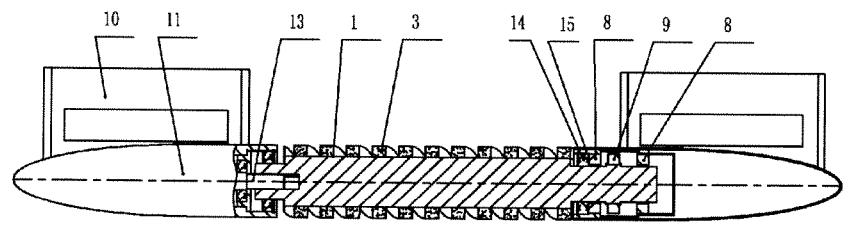
FIG. 25 is an assembly schematic diagram of the spiral rotors of the linear permanent magnet driving system of the permanent magnet driving maglev train rail system.

The shaft journal of the spiral rotor 1 is connected with an output end of a motor 11 via a transmission shaft 13, a main bearing 14 is supported at two ends of the spiral rotor 1 and is in sliding fit with the bearing block 15, and two ends are provided with guide covers, shown as FIG. 25; the motor 11 actuates the spiral rotor 1 to rotate at high speed through the transmission shaft 13, the spiral rotor 1 moves axially during transmission, and owing to the axial permanent magnet thrust positioning device of the spiral rotor 1, i.e. magnetic repulsion balance of the permanent magnet ring 9 and the permanent magnet discs 8, axial load of the main bearing 14 is greatly lessened and even eliminated, axial friction and heating of bearing are reduced in case of high rotating speed and large axial transmission force, thereby prolonging the service life of bearing and saving energy.

Description is Made to Typical Applications of the Linear Permanent Magnet Driving Machine in the Maglev Train Rail System with Reference to Embodiments Based on different opening directions of the spiral stator 2 and different connection manners of the spiral rotor 1 and the connecting arm 10, multiple different proposals of the maglev train rail system can be created. Description is made below to the invention with reference to 4 typical structures.

Embodiment 1

Viaduct Hanger Rail-Type Permanent Magnet Driving Maglev Train

Figure 26:
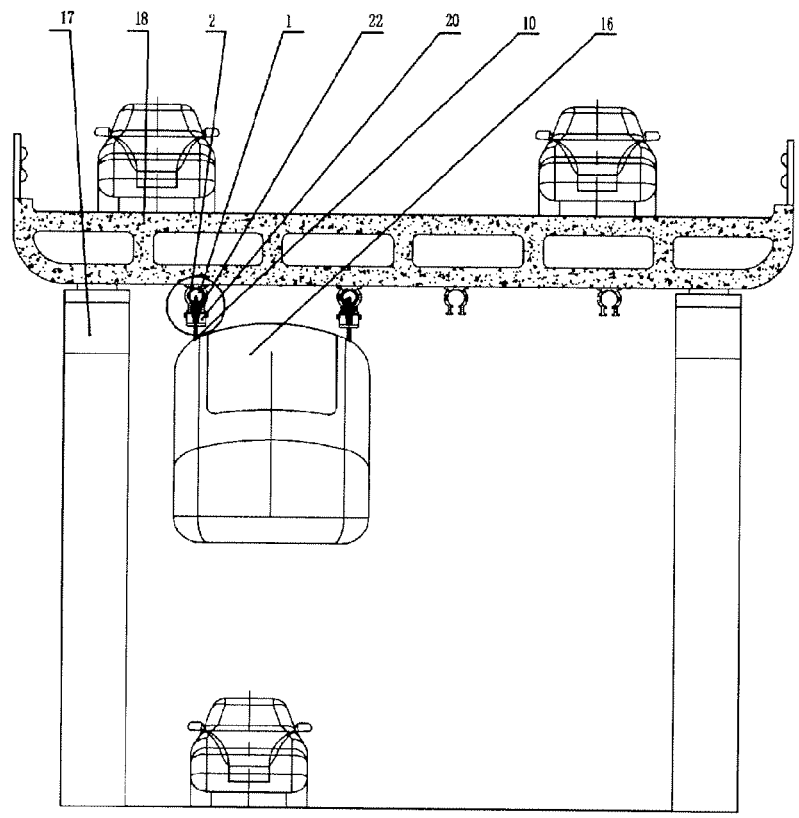
FIG. 26 is a structural schematic diagram of viaduct hanger rail-type permanent magnet driving maglev train.

Shown as FIG. 26, a concrete viaduct cross beam 18 is laid on a concrete pier 17, the bottom of the concrete viaduct cross beam 18 is fixedly connected with the spiral stator 2 which is coaxial with the spiral rotor 1, the spiral stator is bushing-shaped with an opening facing downwards and is formed, in a manner of extending downwards, with an integrated structure of a groove positioning rail and a magnetically conductive armature 7 at the opening.

The spiral rotor 1 is connected with a vehicle body 16 via a connecting arm 10, the connecting arm 10 is provided with a U-shaped iron core 20, a middle transverse bridge of the U-shaped iron core 20 is embedded with a permanent magnet adjustment device, namely the middle part is grooved for the installation of a cylindrical rotating shaft 21 of a permanent magnet 19, the end part where the U-shaped iron core 20 is corresponding to the armature 7 is provided with electromagnetic coils 12, the U-shaped iron core 20 having the permanent magnet adjustment device, the electromagnetic coils 12 and the armature 7 generate suction, and the magnetic levitation suction can be adjusted according to different load requirements of the vehicle body; the magnetic field of the permanent magnet 19 is conducted to two ends of the U-shaped iron core 20 via the rotating shaft 21 in order to form an integral magnetic path with the corresponding armature 7 to further generate levitation suction. The rotating shaft 21 is in sliding fit with the U-shaped iron core and can rotate inside the cylindrical notch of the iron core 20 to lead to the change of the magnetic field, the magnetic suction reaches maximum when two poles of the permanent magnet 19 are respectively in the horizontal direction, the magnetic field is closed inside the iron core in case of 90°-rotation, generating no magnetic suction for the external armature 7, and the levitation suction of the permanent magnet levitation system can be controlled by changing the rotating angle of the rotating shaft 21 through motor or mechanical driving device, in cooperation with the action of the levitation-assistant electromagnetic coils 12.

Figure 27:
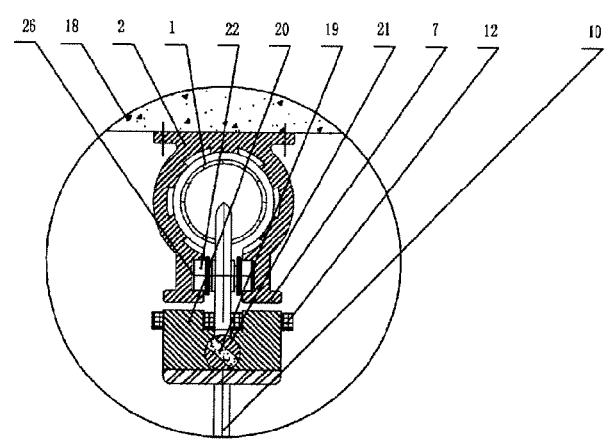
FIG. 27 is a partially enlarged structural schematic diagram of FIG. 26.

The connecting arm 10 is further provided with a wheel shaft which is provided with guide wheels 22, the guide wheels 22 are distributed at two sides of the connecting arm 10 and installed inside the groove positioning rail, shown as FIG. 27; the guide wheels play the role of defining the balance position at which the spiral stator 2 and the spiral rotor 1 remain concentric, controlling the gap between the U-shaped iron core 20 on the connecting arm 10 and the armature 7 at proper position, bearing extra loads during turning or vibration and simultaneously preventing derailing of the train body.

Two spiral rotors 1 are respectively driving by an electric motor, and the rotation direction thereof preferably is opposite direction to mutually offset the torque generated during transmission of the spiral rotor 1 and the spiral stator 2. As the spiral rotor 1 rotates, the spiral blocks 3 thereon and the spiral strips 4 on the spiral stator 2 generate a forward pull force, driving maglev train to move forward. The pulling force between the spiral rotor 1 and the spiral stator 2 is obliquely upward, which can provide upward suspension component of force and forward driving force simultaneously.

A variety of locomotives can travel on the concrete viaduct, the maglev train can travel aerially below the viaduct and a variety of locomotives can travel on the ground, hence, a spatially stereoscopic passenger transport network is formed, the utilization rate of viaduct is enhanced and the passenger capacity per unit space is raised.

Embodiment 2

Low-Speed Underground Rail Maglev Airbus

Figure 28:
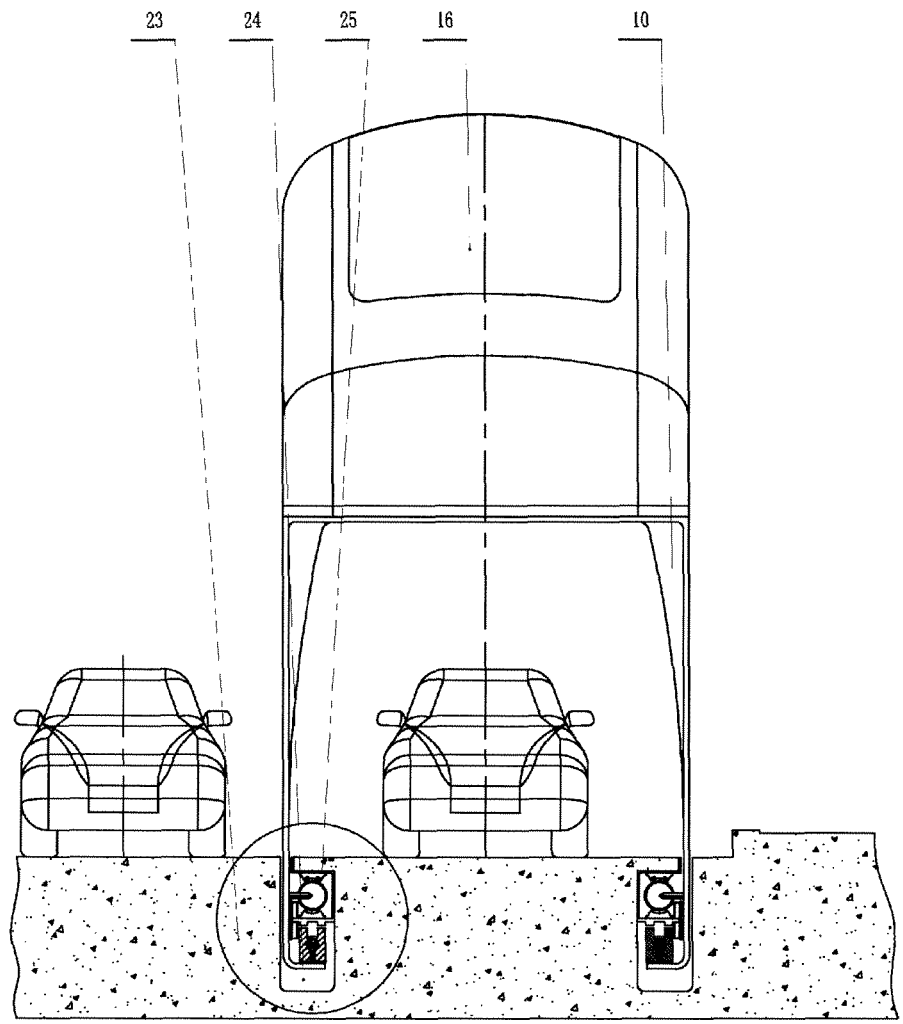
FIG. 28 is a structural schematic diagram of underground rail permanent magnet driving maglev airbus.
Figure 29:
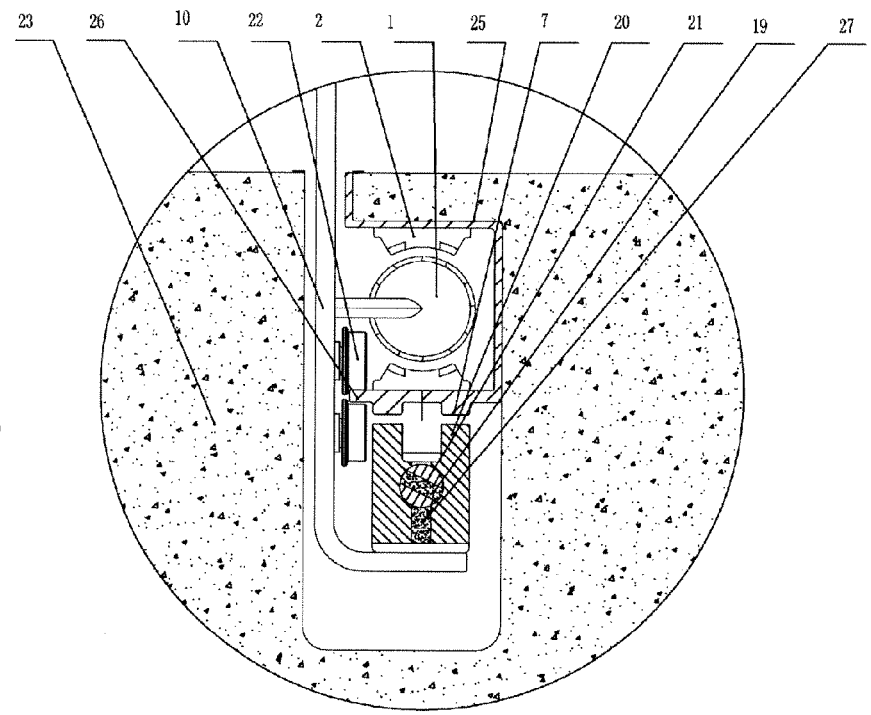
FIG. 29 is a partially enlarged structural schematic diagram of FIG. 28.
Figure 30:
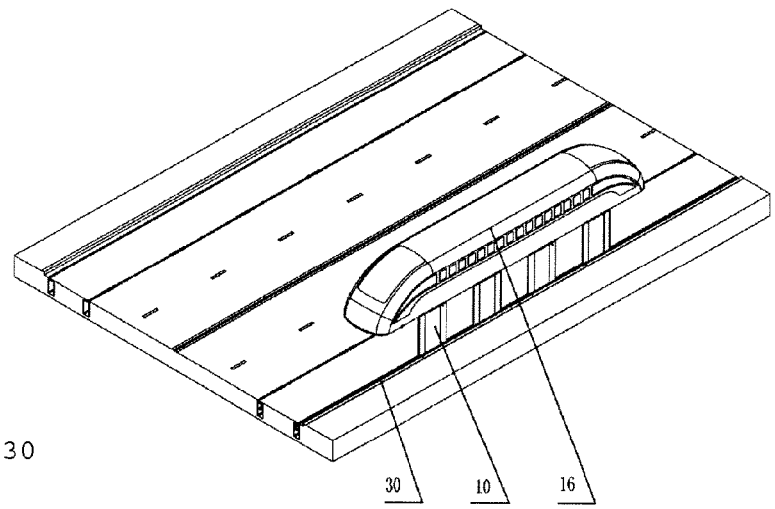
FIG. 30 is a stereoscopically structural schematic diagram of FIG. 28.

Shown as FIGS. 28 to 30, an underground hole 24 is arranged below a roadbed 23 of bus line. The underground hole 24 is internally provided with a linear permanent magnet driving system, a permanent magnet levitation system capable of adjusting levitation suction, a guide wheel safety system and a electromagnetic auxiliary control system, a maglev airbus body 16 is supported by a quite long connecting arm 10 to aerially travel at 2 meters above the ground, i.e. the airbus, the airbus body 16 is connected with a spiral rotor 1 through the connecting arm 10. Car, jeep and other small locomotives can travel in the space at the bottom of the airbus, and parking and traveling of the airbus causes no hindrance to passage of other vehicles, thus barrier-free parking can be realized.

The airbus is driven by the linear permanent magnet driving system arranged inside the underground hole 24, and levitation thereof is implemented and controlled by the permanent magnet levitation system capable of adjusting levitation suction. Shown as FIG. 29, the underground hole 24 is internally provided with a suspension-type rail 25, the interior of the suspension-type rail 25 is vertically, fixedly provided with spiral stators 2 in the middle thereof, and the suspension-type rail 25 stretches out of a positioning rail 26 laterally; an armature 7 is the integrated structure of the suspension-type rail 25 and positioned at the lower part of the suspension-type rail 25 in opposition to an H-shaped iron core, the position of a middle cross bridge of the H-shaped iron core is embedded with a permanent magnet adjustment device, i.e. the middle thereof is grooved for the installation of a cylindrical rotating shaft 21 of a permanent magnet 19, meanwhile, the lower part of the middle cross bridge of the H-shaped iron core is provided with a permanent magnet 27; magnetic field intensity can be strengthened when the magnetic fields of the two permanent magnets are arranged in the same direction. The magnetic field intensity between the H-shaped iron core 20 and the armature 7 can be controlled to vary between the maximum and the minimum by means of the angle of the rotating shaft 21 of motor or mechanical device. The levitation suction of the permanent magnet levitation system can be controlled by changing the rotating angle of the rotating shaft 21.

Guide wheels 22 are further arranged above the extended connecting arm 10 in a manner of leaning against the positioning rail 26 of the suspension-type rail 25. In case of low speed, the guide wheels can play the role of limiting the movement of the levitation system and the driving system along predetermined tracks without deviance, thereby guaranteeing the traveling on condition of constant minimal contact pressure between the guide wheels 22 and the positioning rail 26. The guide wheels 22 can prevent the unbalance resulted from overlarge centrifugal force of the bus upon turning or from sharp change of forces.

The spiral rotor 1 rotates inside the spiral stators 2 and moves in the axial direction to actuate the connecting arm 10 to drive the traveling of the airbus body 10.

The spiral rotor 1 and the spiral stators 2 are embedded underground; the strong magnetic field of the spiral rotor 1 is enclosed by the spiral stators 2 and the suspension-type rail 25 to further shield magnetic field, causing no impact of electromagnetic radiation to the ground.

A ground surface opening 30 of the underground rail is far smaller than the width of rubber wheels of locomotive, thereby having no influence on traveling and turning of locomotives on the ground, the locomotives can not only travel below the airbus, but can also make a turn and change lane outside the airbus at any time, so great suitability for urban ground is achieved, a fast passenger car passage is built up to realize the effect of two lanes in one lane, thus the passenger capacity is obviously raised and passenger movement is speeded up, such a proposal, between subway and viaduct structures, has much lower cost than subway and viaduct structures and simultaneously avoids the piston resistance effect of subway train, traveling resistance is smaller, frictional resistance is extremely small and operating noise is low owing to the adoption of permanent magnet levitation and permanent magnet driving technologies, therefore, traveling, with the energy saved by 50% to 90% compared with subway train and common passenger car, can be realized.

Embodiment 3

Viaduct Encircling Maglev Train

Figure 31:
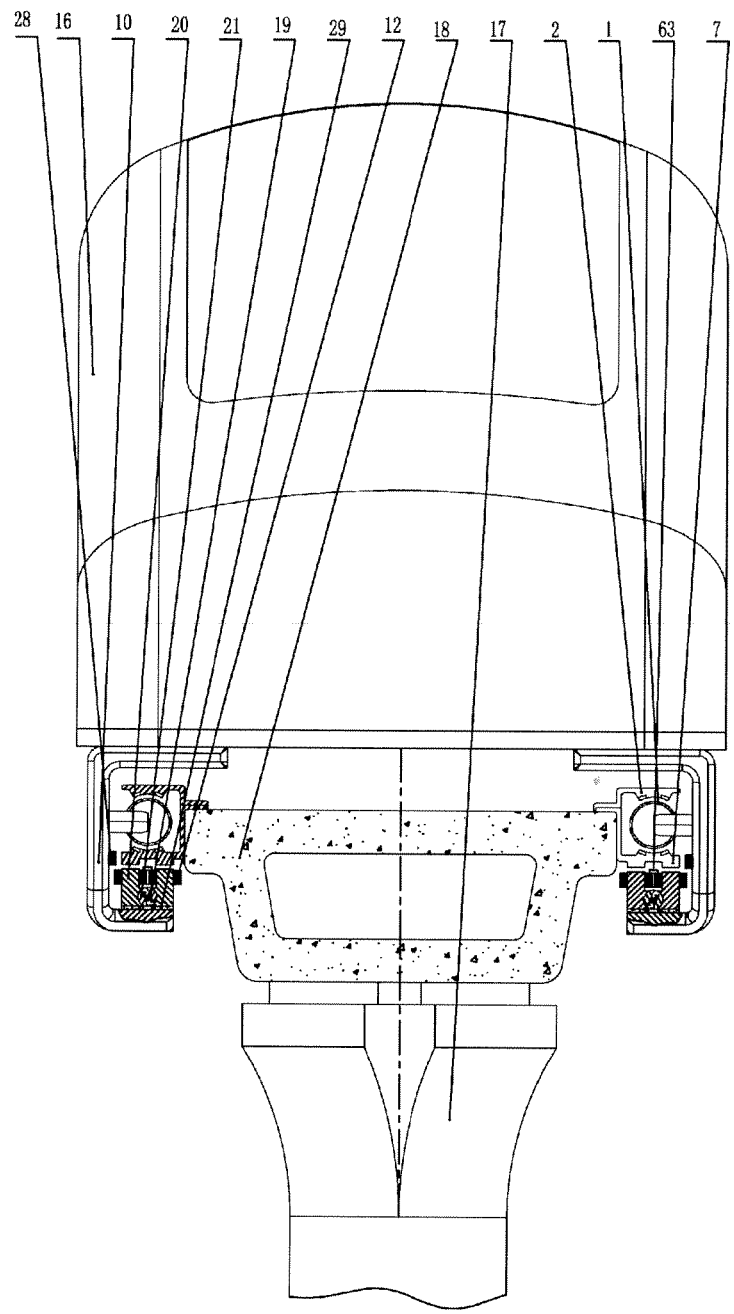
FIG. 31 is a structural schematic diagram of viaduct encircling maglev train.

Shown as FIG. 31, the viaduct encircling maglev train is characterized in that, a concrete viaduct cross beam 18 is laid above a concrete viaduct pier, left and right sides of the concrete viaduct cross beam 18 are fixedly connected with spiral stators 2, which is similar to the above maglev airbus, spiral rotors 1 arranged concentrically with the spiral stators 2 are connected with a train body 16 through connecting arms 10, the connecting arms 10 are provided with H-shaped iron cores 20; the difference from the maglev airbus is that this structure further comprises an electromagnetic auxiliary control system, i.e. levitation-assistant electromagnetic coils 12 and guidance-assistant electromagnetic coils 28 are mainly related to; the levitation-assistant electromagnetic coils 12 are installed on the iron cores 20 of the permanent magnet levitation system in vertical correspondence to armatures 7; displacement sensors 63 are installed on the connecting arms 10 in vertical correspondence to the armatures 7; and the guidance-assistant electromagnetic coils 28 are installed on the connecting arms 10 in horizontal correspondence to the armatures 7.

The magnetic suction between the iron cores 20 of the permanent magnet levitation system and the armatures 7 mainly is permanent magnetic levitation force, and the proper permanent magnetic levitation force is offered by controlling the rotating angle of permanent magnets via a magnetic force adjustment system, i.e. rotating shafts 21. When the maglev train is vertically deviated from the balance position, electromagnetic reposition force is generated between the levitation-assistant electromagnetic coils 12 and the armatures by means of the displacement sensors 63 and feedback loop control to bring the maglev train back to the balance position. When the train body inclines toward two sides, a reposition force toward the center is generated between the guidance-assistant electromagnetic coils 28 and the armatures 7 to horizontally maintain the train body 16 at the central balance position. In case that the train body is at the balance position, almost no power is consumed for levitation, and only small reposition current is required in case that the train body is deviated from the balance position, thereby realizing the energy-saving magnetic levitation with zero-power control.

In the permanent magnet levitation system, capable of adjusting levitation suction, of the viaduct encircling maglev train, two bottom surfaces of the H-shaped iron cores 20 are respectively provided with permanent magnets 29 with the magnetic poles thereof being arranged in opposite vertical directions, the bottoms of the two permanent magnets 29 are further provided with magnetically conductive material. The connecting arms 10 can also be made of the magnetically conductive material. The magnetic fields of the permanent magnets 29 and of permanent magnets 19 embedded inside the rotating shafts 21 are mutually superposed and offset so as to adjust the levitation suction at proper level, and the maximal magnetic field intensity can be reached when the magnetic field direction of the permanent magnets 19 is horizontal. When the rotating shafts 21 rotate by 180 degrees, the magnetic field directions of the two permanent magnets at the bottom and of the permanent magnet in the middle are mutually offset, further resulting in the minimal magnetic field intensity. The magnetic field intensity between the H-shaped iron cores 20 and the armatures 7 corresponding thereto can be controlled to change between the minimum and the maximum by adjusting the rotating angle of the rotating shafts 21. The change of the levitation suction of the permanent magnet levitation system can be controlled by changing the rotating angle of the rotating shafts 21 via motor or mechanical driving device.

With the help of small occupied area of the viaduct structure, such a high-speed maglev train can promote passenger/cargo transportation in and between urban areas and can also speed up passenger movement and remarkably lower the cost of logistics transportation, shown as FIG. 31.

During high-speed traveling of maglev train, the spiral rotors 1 rotating at high speed, just as inertial gyroscope, has the effect of self-stabilization, so the levitation of maglev train can be easily controlled.

Figure 32A:
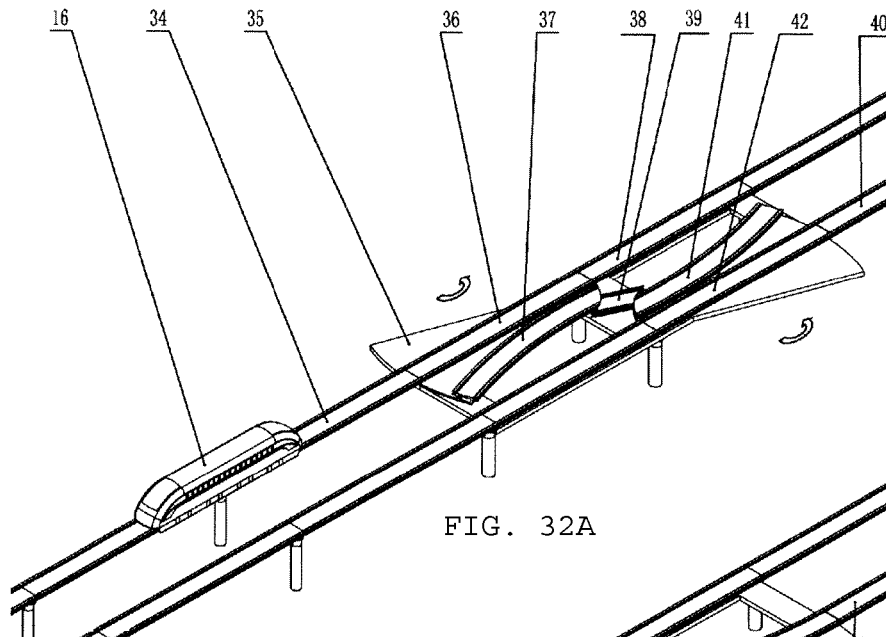
FIG. 32(a) is a stereoscopically structural schematic diagram of the rotational turnout switching system under the state of straight traveling.
Figure 32B:
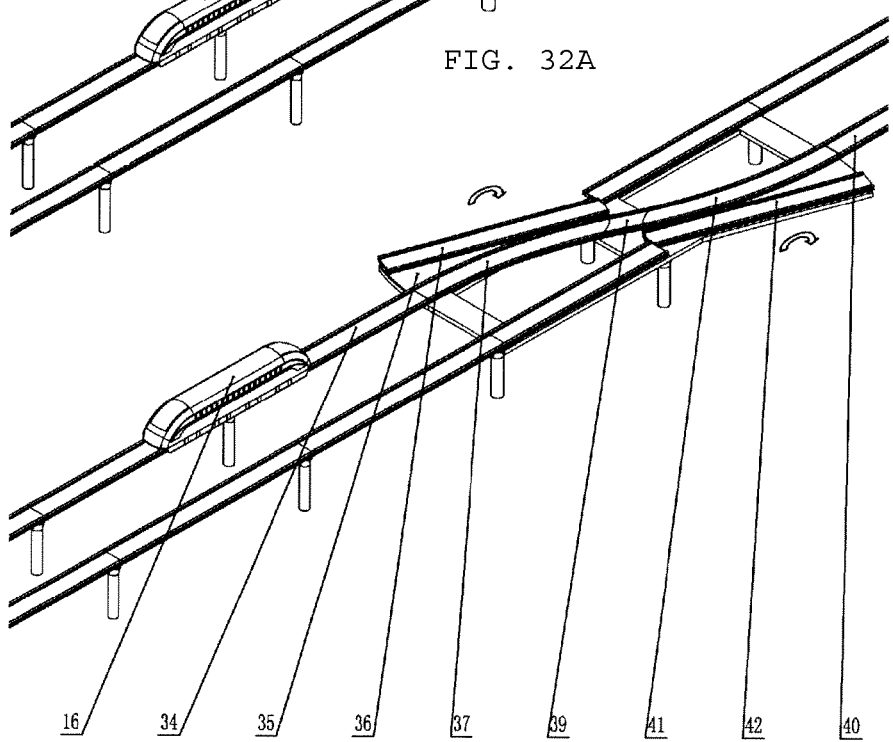
FIG. 32(b) is a stereoscopically structural schematic diagram of the rotational turnout switching system under the state of turning.

Detailed description is further made below to two turnout switching systems of the invention with reference to the drawings:

A rotational turnout switching system of the permanent magnet driving maglev train rail system, shown as FIGS. 32(*a*) and 32(*b*), is arranged at a turnout of the rail and comprises a pair of rotational turnout bottom plates 35 and a middle transitional rail 39': i.e. openings with cylindrical end faces are formed at the rail turnout by means of cutoff and are internally provided with the turnout bottom plates 35, each turnout bottom plate 35 is equipped with the transitional rail comprising straight rails 36 and 42 and curved rails 37 and 41; the turnout bottom plates 35 are drawn by a switching driving device and can rotate clockwise or anticlockwise around the rotating shaft; a switching joint bottom plate between the turnout bottom plates is provided with the middle transitional rail 39' that can be either fixed or revolved, and in this embodiment, the middle transitional rail 39' always keeps fixed.

In case of straight traveling of a maglev train, the turnout bottom plates 35, drawn by the switching driving device, rotate anticlockwise around the vertical rotating shaft to the position shown as FIG. 32(*a*), the straight rails at two ends of the turnout are jointed with each other by the straight rails 34-36-38 on the turnout bottom plates 35, hence, the maglev train can travel straight at high speed.

In case that switching is required, the two turnout bottom plates 35 are drawn by the switching driving device and simultaneously rotate clockwise to the position shown as FIG. 32(*b*), the straight rail 34 is jointed with the curved rails 37-39-41 and also jointed with another straight rail 40, so the maglev train 16 completes switching and continues traveling on another rail 40.

Figures 33A, 33B:
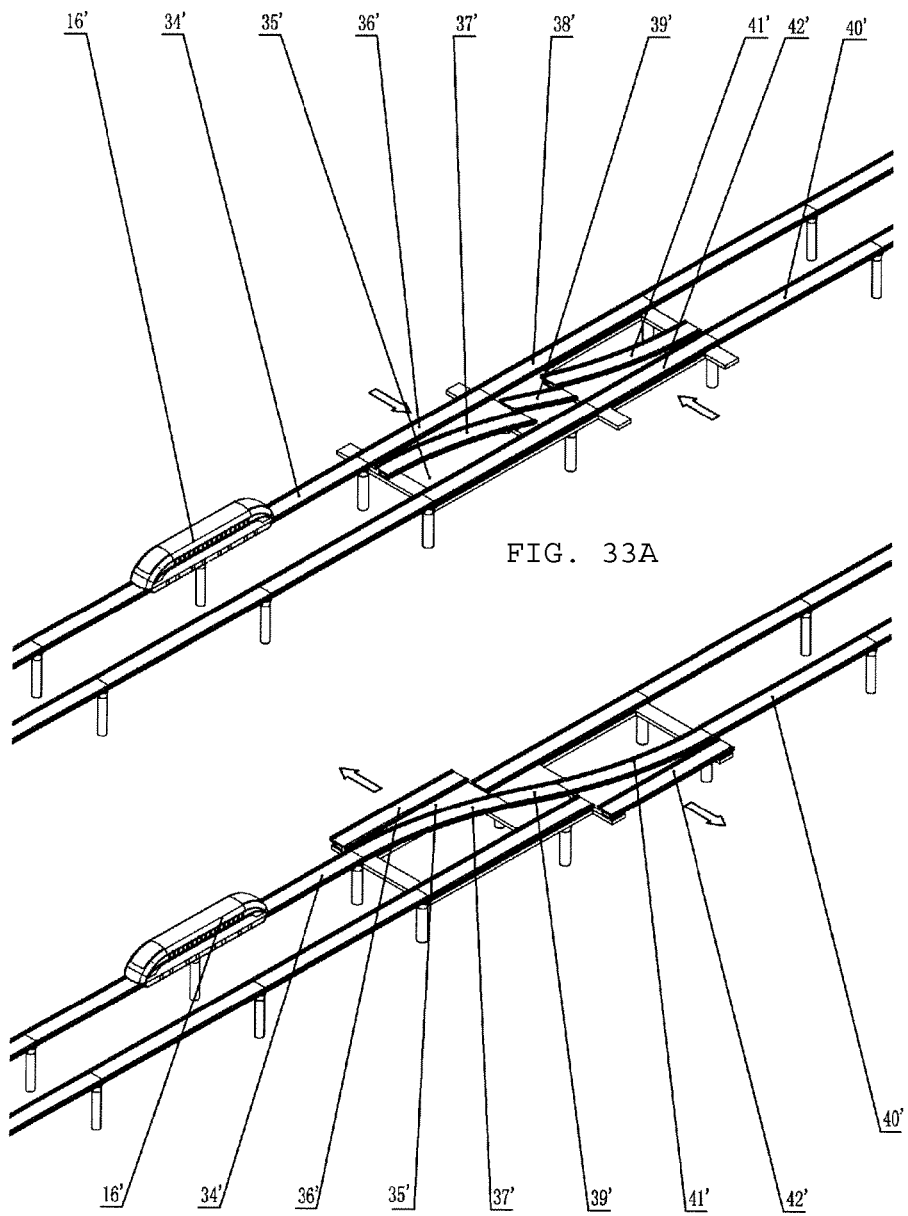
FIG. 33(a) is a stereoscopically structural schematic diagram of the translational turnout switching system under the state of straight traveling.
FIG. 33(b) is a stereoscopically structural schematic diagram of the translational turnout switching system under the state of making a turn.

A translational turnout switching system of the permanent magnet driving maglev train rail system, shown as FIGS. 33(*a*) and 33(*b*), is arranged at a turnout of the rail and comprises a pair of translational turnout bottom plates 35' and a middle transitional rail 39': parallel planar openings are formed at the rail turning by means of parallel cutoff and are internally provided with the turnout bottom plates 35', each turnout bottom plate 35' is equipped with the transitional rail comprising straight rails 36' and 42' and curved rails 37' and 41'; the turnout bottom plates 35' are drawn by the switching driving device and can slide horizontally; the middle transitional rail 39' is arranged between the two turnout bottom plates 35', fixed position is required to be kept in the structure shown as Figures, and the bottom of the middle transitional rail 39' is provided with the switching joint bottom plate.

In case of straight traveling of a maglev train, the turnout bottom plates 35', drawn by the switching driving device, implement inward translation to the position shown as FIG. 33(*a*), the straight rails 34'-36'-38' are jointed, so the maglev train 16 can travel straight at high speed.

In case that switching is required, the turnout bottom plates 35', drawn by the switching driving device, implement outward translation respectively to the position shown as FIG. 33(*b*), the straight rail 34' is jointed with the curved rails 37'-39'-41' and also jointed with another straight rail 40', so the maglev train 16 completes switching and continues traveling on another rail 40'.

Embodiment 4

Universal Encircling Maglev Train

Figure 34:
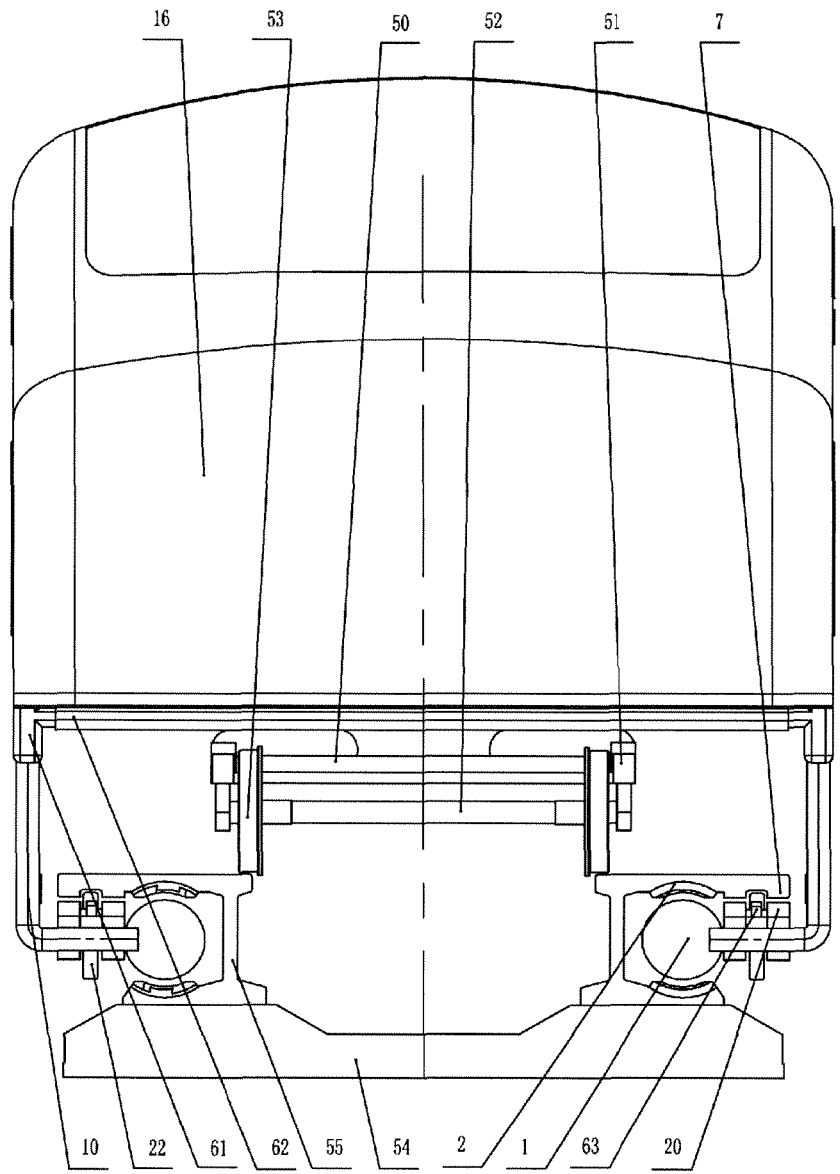
FIG. 34 is a longitudinally structural schematic diagram of universal maglev train.
Figure 35:
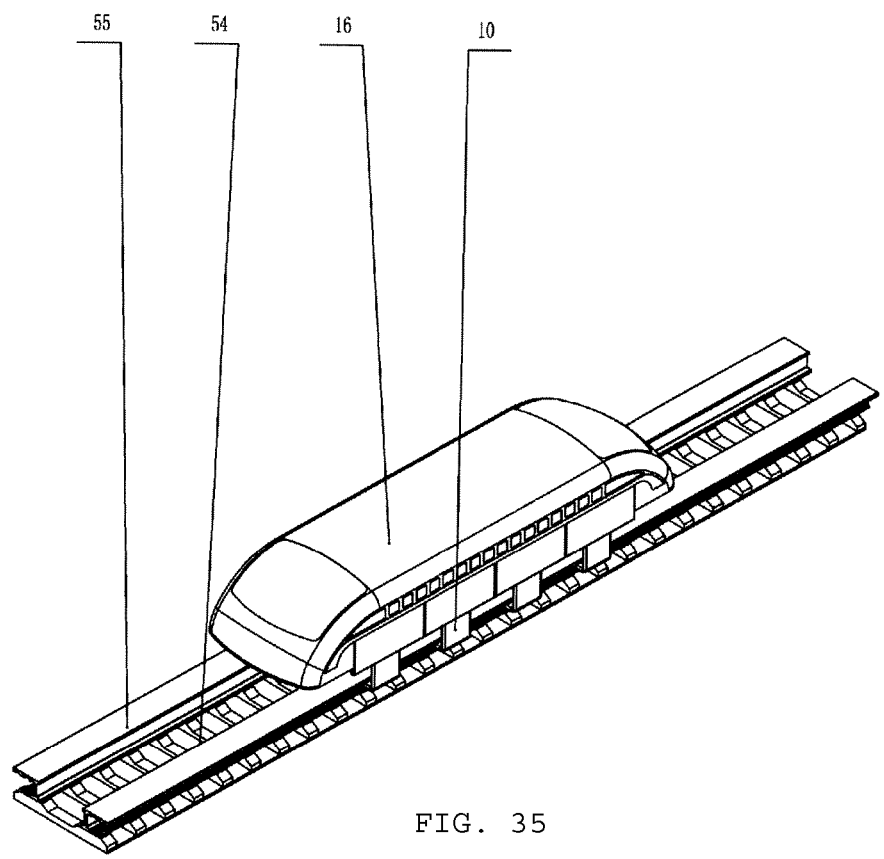
FIG. 35 is a stereoscopically structural schematic diagram of FIG. 34.

What is shown as FIGS. 34 and 35 is the universal solution for both common rail and high-speed maglev rail, which leads the maglev rail to universality, networkability and compatibility in transportation.

Shown as FIG. 34, the universal encircling maglev train is characterized in that: based on the above encircling maglev train, the bottom of the universal encircling maglev train is equipped with a chassis 50, a suspension 51, a wheel shaft 52 and wheels 53 which all can also be used for current rail, a transverse movement device 62 is arranged between the bottom of a train body 16 and connecting arms 10, the outer end of the transverse movement device 62 is connected with longitudinal lifting devices 61, the ends of the longitudinal lifting devices 61 are connected with the connecting arms 10, and the lower ends of the connecting arms 10 are connected with the linear permanent magnet driving systems each comprising a spiral rotor 1. When the maglev train travels under the condition of magnetic levitation, the spiral rotors 1 are accurately positioned at the balance positions of spiral stators 2 by means of telescopic movement of the longitudinal lifting devices 61 and the transverse movement device 62 under the action of lifting control devices fixed on the connecting arms and of displacement sensors 63. And simultaneously, the wheels 53 at the bottom of the train body 16 are disengaged or slightly contacted with a rail 55, shown as FIG. 34.

The connecting arms are also equipped with guide wheels 22 that can prevent the unbalance resulted from overlarge centrifugal force of the maglev train upon turning or from sharp change of forces.

The transformation course of the universal encircling maglev train on maglev rail or common rail is shown as FIGS. 36(a) to 36(b):

The traveling state of the maglev train on the maglev rail is shown as FIG. 36(a), and speed reduction is implemented and complete contact between the wheels at the bottom and the rail is then realized before the maglev train is about to travel on the common rail.

After the maglev train is speed-reduced or stops, the connecting arms 10 are drawn outwards by the transverse movement device 62 in the horizontal direction to move, in order to actuate the spiral rotors 1 to move outwards until the complete disengagement thereof from the rail is achieved, shown as FIG. 36(b).

Afterwards, the connecting arms move upwards under the action of the longitudinal lifting devices 61, in order to actuate the spiral rotors 1 to be lifted upwards to the upper part of the wheel/rail, shown as FIG. 36(c).

Then, the connecting arms 10 move toward the inner side under the contraction action of the transverse movement device 62, in order to actuate the spiral rotors 1 to be folded inwards, shown as FIG. 36(d), namely the transformation course of traveling from the maglev rail to the common wheel/rail is completed. The maglev train then travel on the common wheel/rail at low speed.

Contrarily, the traveling of the universal encircling maglev train from the common wheel/rail to the maglev rail can also be realized according to contrary operation procedures, namely, actuated by the transverse movement device 62 and the longitudinal lifting devices 61, the connecting arms 10 position the spiral rotors 1 fixed thereon inside the spiral stators 2 so that the maglev train can travel on the maglev rail at high speed.

The above universal encircling maglev train realizes the convenient transformation of maglev train between common rail and maglev rail so as to obtain universality, networkability and compatibility in transportation.

The implementation of the combination of the above embodiments can form a comprehensive stereoscopic maglev traffic network system, which is green, energy-saving and complementary to other current traffic systems.

What is described above is merely related to the preferred embodiments of the invention, not the limitation to the extent of protection of the invention, any equivalent alternations or variations in accordance with the technical proposal of the invention and the concept thereof from the skilled in this art within the disclosed technical scope should be within the extent of protection of the invention.

The invention claimed is:

1. A linear permanent magnet driving system, comprising an engine, rotors, stators, a main bearing and a bearing block, the shaft journal of the rotor being connected with an output end of the engine via a transmission shaft and the main bearing being supported at two ends of the rotor and is in sliding fit with the bearing block;

wherein:
the rotors are formed into spiral rotors by spiral blocks which are raised outwards around a circumferential surface thereof and arranged spirally in the direction of a rotor shaft thereof, the spiral blocks forming single-head spirals or multiple-head spirals;

the surfaces on the stators, opposite to the spiral rotors, are distributed with regular raised structures corresponding to the spiral blocks;

at least one of the spiral rotor and the stator adopts the structure having a permanent magnet while the other one adopts the structure having the permanent magnet or a magnetizer;

the stators have a structure of one of following structures (1)-(4) or a combination of (1)-(4):

(1) the stators being spiral stators of more than 1 non-closed tiling-shaped structure coaxial with the spiral rotors and distributed in a circumferential direction of the spiral rotors, wherein the raised structure on the stators are spiral strips corresponding to the spiral blocks on the spiral rotors and single-head spirals or multiple-head spirals are correspondingly formed; and wherein pitches of the spiral rotors and the spiral stators are consistent, having a spiral angle $\beta<90°$;

(2) the stators being spiral stators of more than 1 non-closed tiling-shaped structures distributed in a circumferential direction of a section of the spiral rotors, wherein an axis of the stators is slightly curved, the raised structure on the stators are spiral strips corresponding to the spiral blocks on the spiral rotors and single-head spirals or multiple-head spirals with slightly-curved axis are correspondingly formed; and pitches between the spiral rotors and the spiral stators are consistent, having a spiral angle $\beta<90°$;

(3) the stators being spiral stators of more than 1 non-closed tiling-shaped structure coaxial with the spiral rotors and distributed in the circumferential direction of the section of the spiral rotors, wherein the raised structure on the stators are curved-side rhombic spiral strips composed of left-spiral and right-spiral strips corresponding to the spiral blocks on the spiral rotors, and single-head spirals or multiple-head spirals correspondingly formed; and (4) the corresponding surfaces of the stators are planes, the raised structures thereon are helical toothed strips, curved-side rhombic, fusiform or cylindrical, and the curved-side rhombuses are the raised structures composed of the intersections of the left-spiral and right-spiral strips, and wherein:

the linear permanent magnetic driving system, further comprises:

a spiral rotor axial permanent magnet thrust positioning device, which is mainly composed of a permanent magnet ring and permanent magnet discs;

wherein the permanent magnet ring is coaxially fixed on the shaft journal of the spiral rotors; and wherein the permanent magnet discs are fixed inside the bearing block and arranged at two sides of the permanent magnet ring in the axial direction and opposite to the permanent magnet ring in a homopolar manner respectively.

2. The permanent magnet driving maglev train rail system according to claim 1, wherein the permanent magnet levitation system is capable of adjusting levitation suction and comprises an iron core and an armature opposite thereto, the iron core being U-shaped or H-shaped, wherein a permanent magnet adjustment device is embedded into the position of a middle linkage bridge of the U-shaped or H-shaped iron core, and wherein the permanent magnet adjustment device comprises a cylindrical rotating shaft, the middle of which is grooved for the installation of the permanent magnet; the armature is fixed on the rail or the stators to form, with the rail and the stators, a split/combination structure or an integrated structure.

3. The permanent magnet driving maglev train rail system according to claim 2, wherein the lower part of the bottom and/or middle linkage bridge of the H-shaped iron core is provided with the permanent magnet.

4. A permanent magnet driving maglev train rail system, comprising:

a linear permanent magnetic driving system, a permanent magnet levitation system, a guide wheel safety system, and an electromagnetic auxiliary control system, wherein:

the linear permanent magnetic driving system comprises an engine, rotors, stators, a main bearing and a bearing block, where the shaft journal of the rotor is connected with an output end of the engine via a transmission shaft and the main bearing is supported at two ends of the rotor and is in sliding fit with the bearing block;

the rotors are formed into spiral rotors by spiral blocks which are raised outwards around a circumferential surface thereof and arranged spirally in the direction of a rotor shaft thereof, the spiral blocks form single-head spires or multiple-head spires;

the surfaces on the stators, opposite to the spiral rotors, are distributed with regular raised structures corresponding to the spiral blocks; and at least one of the spiral rotor and the stator adopts the structure having a permanent magnet while the other one adopts the structure having the permanent magnet or a magnetizer; and wherein the stators have one of following structures (1)-(4) or a combination of (1)-(4):

(1) the stators being spiral stators of more than 1 non-closed tiling-shaped structure coaxial with the spiral rotors and distributed in a circumferential direction of the spiral rotors, wherein the raised structure on the stators are spiral strips corresponding to the spiral blocks on the spiral rotors and single-head spirals or multiple-head spirals are correspondingly formed; and pitches of the spiral rotors and the spiral stators are consistent, having a spiral angle 0<90°;

(2) the stators being spiral stators of more than 1 non-closed tiling-shaped structure distributed in a circumferential direction of a section of the spiral rotors, wherein an axis of the stators is slightly curved, wherein the raised structures on the stators are spiral strips corresponding to the spiral blocks on the spiral rotors and single-head spirals or multiple-head spirals with slightly-curved axis are correspondingly formed; and pitches between the spiral rotors and the spiral stators are consistent, having a spiral angle β<90°;

(3) the stators being spiral stators of more than 1 non-closed tiling-shaped structure coaxial with the spiral rotors and distributed in the circumferential direction of the section of the spiral rotors, wherein the raised structure on the stators are curved-side rhombic spiral strips composed of left-spiral and right-spiral strips corresponding to the spiral blocks on the spiral rotors, and single-head spirals or multiple-head spirals correspondingly formed;

(4) the corresponding surfaces of the stators being planes, wherein the raised structures thereon are helical toothed strips, curved-side rhombic, fusiform or cylindrical; and wherein the spiral rotors are connected with maglev train body via a connecting arm, and the stators are fixed on the rail to form, with the rail, a split/combination structure or an integrated structure.

5. The permanent magnet driving maglev train rail system according to claim 4, wherein:

the linear permanent magnetic driving system further comprises a spiral rotor axial permanent magnet thrust positioning device, comprising a permanent magnet ring and permanent magnet discs;

the permanent magnet ring is coaxially fixed on the shaft journal of the spiral rotors; and the permanent magnet discs are fixed inside the bearing block and arranged at two sides of the permanent magnet ring in the axial direction and opposite to the permanent magnet ring in a homopolar manner respectively.

6. The permanent magnet driving maglev train rail system according to claim 4, wherein the electromagnetic auxiliary control system comprises an electromagnetic auxiliary levitation system and an electromagnetic auxiliary guide system;

wherein the electromagnetic auxiliary levitation system is installed on the iron core of the permanent magnet levitation system capable of adjusting levitation suction, and opposite to the armature vertically; and wherein the electromagnetic auxiliary guide system is installed on the connecting arm to correspond to the armature horizontally.

7. The permanent magnet driving maglev train rail system according to claim 4, further comprising a turnout switching system, which is installed at the turnout of the rail and comprises a pair of translational or rotational turnout bottom plates, a switching joint bottom plate, a switching driving device and a transmission device; wherein:

the turnout bottom plate is equipped with a transitional rail respectively comprising a straight rail and a curved rail, the switching joint bottom plate is equipped with a engaging rail for the curved rail; under the control of the control system, and the switching driving device leads the turnout bottom plates to translation or rotation via the transmission device, thereby achieving the jointing of the straight rails or the curved rails.

8. The permanent magnet driving maglev train rail system according to claim 4, further comprising a driving transformation system which comprises transverse and longitudinal movement devices connected with the connecting arm, wherein the transverse and longitudinal lifting devices are respectively connected with the connecting arm and, which transverse and longitudinal lifting devices, under the action of the control system, lead the connecting arm to horizontal and vertical movement so as to complete the positioning of the spiral rotors and the stators to further realize permanent magnet driving or move the spiral rotors away from the stators to further realize conventional non-magnetic force driving.

* * * * *